US010520756B2

(12) United States Patent
Gallina et al.

(10) Patent No.: US 10,520,756 B2
(45) Date of Patent: Dec. 31, 2019

(54) LAMINATED MIRROR LENS

(71) Applicants: LUXOTTICA S.R.L., Belluno (IT); OAKLEY, INC., Foothill Ranch, CA (US)

(72) Inventors: Andrea Gallina, Monocucco Torinse (IT); Marco Coppa, Casale Monferrato (IT); Philip Denton Gordon, Ladera Ranch, CA (US); Brock Scott McCabe, Laguna Niguel, CA (US); Ryan Saylor, Mission Viejo, CA (US); Carlos D. Reyes, Rancho Santa Margarita, CA (US)

(73) Assignees: Luxottica S.R.L., Belluno (IT); Oakley, Inc., Fotthill Ranch, CA (US)

(*) Notice: Subject to any disclaimer, the term of this patent is extended or adjusted under 35 U.S.C. 154(b) by 0 days.

(21) Appl. No.: 15/515,966

(22) PCT Filed: Sep. 30, 2015

(86) PCT No.: PCT/US2015/053206
§ 371 (c)(1),
(2) Date: Mar. 30, 2017

(87) PCT Pub. No.: WO2016/054198
PCT Pub. Date: Apr. 7, 2016

(65) Prior Publication Data
US 2017/0299898 A1 Oct. 19, 2017

Related U.S. Application Data

(60) Provisional application No. 62/059,763, filed on Oct. 3, 2014.

(51) Int. Cl.
G02B 1/10 (2015.01)
G02C 7/14 (2006.01)
(Continued)

(52) U.S. Cl.
CPC .......... *G02C 7/14* (2013.01); *B29C 45/14811* (2013.01); *B29D 11/00* (2013.01);
(Continued)

(58) Field of Classification Search
CPC . G02C 7/14; G02C 7/12; G02C 7/022; G02C 2202/16; G02B 1/14; B29D 11/00432; B29D 11/00865; B29K 2069/00
(Continued)

(56) References Cited

U.S. PATENT DOCUMENTS 5,724,187 A * 3/1998 Varaprasad ............ B32B 17/06
359/265
5,928,718 A 7/1999 Dillon
(Continued)

FOREIGN PATENT DOCUMENTS

WO WO 2013/034557 3/2013
WO WO 2013/169987 11/2013

OTHER PUBLICATIONS

International Search Report and Written Opinion dated Jan. 13, 2016 in corresponding PCT Application No. PCT/US2015/053206.
(Continued)

Primary Examiner — William R Alexander
(74) Attorney, Agent, or Firm — Sterne, Kessler, Goldstein & Fox P.L.L.C.

(57) ABSTRACT

A lens for eyewear is configured to reduce the appearance of scratches on the lens and/or increase the durability of the lens. The lens can include a functional stack bonded to a lens body. The functional stack can include a functional layer, such as a thin film coating, sandwiched between the lens body and an optical-grade transparent film. The functional stack can increase abrasion resistance and environmental durability of the lens, and can reduce the appearance of scratches on the lens. The combined lens body and func-
(Continued)

tional stack can increase the durability of the lens relative to a lens with a thin film coating (e.g., a gradient or mirror stack) on an external surface of the lens.

21 Claims, 10 Drawing Sheets

(51) Int. Cl.
| | |
|---|---|
| *B29D 11/00* | (2006.01) |
| *G02C 7/02* | (2006.01) |
| *G02C 7/12* | (2006.01) |
| *B29C 45/14* | (2006.01) |
| *B32B 7/12* | (2006.01) |
| *B32B 23/04* | (2006.01) |
| *B32B 23/20* | (2006.01) |
| *B32B 27/08* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 27/40* | (2006.01) |
| *B32B 3/28* | (2006.01) |
| *G02B 1/14* | (2015.01) |
| *G02B 5/08* | (2006.01) |
| *B29K 69/00* | (2006.01) |

(52) U.S. Cl.
CPC .... *B29D 11/00009* (2013.01); *B29D 11/0073* (2013.01); *B29D 11/00432* (2013.01); *B29D 11/00634* (2013.01); *B29D 11/00865* (2013.01); *B32B 3/28* (2013.01); *B32B 7/12* (2013.01); *B32B 23/04* (2013.01); *B32B 23/20* (2013.01); *B32B 27/08* (2013.01); *B32B 27/308* (2013.01); *B32B 27/32* (2013.01); *B32B 27/34* (2013.01); *B32B 27/36* (2013.01); *B32B 27/365* (2013.01); *B32B 27/40* (2013.01); *G02B 1/14* (2015.01); *G02B 5/0816* (2013.01); *G02C 7/02* (2013.01); *G02C 7/022* (2013.01); *G02C 7/12* (2013.01); *B29K 2069/00* (2013.01); *B32B 2250/24* (2013.01); *B32B 2255/10* (2013.01); *B32B 2255/26* (2013.01); *B32B 2307/4026* (2013.01); *B32B 2307/42* (2013.01); *B32B 2307/50* (2013.01); *B32B 2307/518* (2013.01); *B32B 2307/546* (2013.01); *B32B 2307/554* (2013.01); *B32B 2307/714* (2013.01); *B32B 2551/00* (2013.01); *G02C 2202/16* (2013.01)

(58) Field of Classification Search
USPC .................................................. 351/159.56
See application file for complete search history.

(56) References Cited

U.S. PATENT DOCUMENTS

| | | | | |
|---|---|---|---|---|
| 6,242,065 | B1* | 6/2001 | Blomberg | B29D 11/0073 351/159.01 |
| 6,797,383 | B2* | 9/2004 | Nishizawa | B32B 27/08 351/159.56 |
| 7,927,522 | B2* | 4/2011 | Hsu | B29D 11/0073 264/1.32 |
| 7,964,121 | B2* | 6/2011 | Hsu | B29D 11/0073 264/1.32 |
| 8,002,935 | B2* | 8/2011 | Sugimura | B29C 51/008 156/196 |
| 8,057,716 | B2* | 11/2011 | Hsu | B29D 11/0073 264/1.32 |
| 8,092,726 | B2* | 1/2012 | Hsu | B29D 11/0073 264/1.32 |
| 8,367,211 | B2* | 2/2013 | Qin | B32B 27/08 428/423.1 |
| 2001/0035935 | A1 | 11/2001 | Bhalakia et al. | |
| 2003/0001991 | A1* | 1/2003 | Faris | G02B 5/3016 349/98 |
| 2004/0229056 | A1 | 11/2004 | Hayashi | |
| 2006/0269697 | A1 | 11/2006 | Sharp | |
| 2007/0195422 | A1* | 8/2007 | Begon | B29C 63/16 359/642 |
| 2012/0015111 | A1* | 1/2012 | Mishina | B29D 11/00913 427/535 |
| 2013/0107563 | A1* | 5/2013 | McCabe | F21S 43/14 362/540 |
| 2013/0141693 | A1* | 6/2013 | McCabe | G02C 7/104 351/159.56 |
| 2015/0131047 | A1* | 5/2015 | Saylor | G02C 7/12 351/44 |
| 2015/0241602 | A1* | 8/2015 | Avetisian, Sr. | G02B 1/113 359/359 |
| 2015/0277150 | A1* | 10/2015 | Granger | B33Y 70/00 351/159.43 |
| 2016/0377886 | A1* | 12/2016 | Quiroga | G02C 7/083 349/13 |
| 2018/0290408 | A1* | 10/2018 | Park | G02C 7/12 |
| 2018/0299599 | A1* | 10/2018 | Kumar | B29D 11/00644 |
| 2018/0299600 | A1* | 10/2018 | Miller | B29D 11/00644 |
| 2018/0299702 | A1* | 10/2018 | Nguyen | B29D 11/00644 |

OTHER PUBLICATIONS

Extended European Search Report, issued Jul. 23, 2018 in EPC Application No. 15847895.8; 8 pages.

* cited by examiner

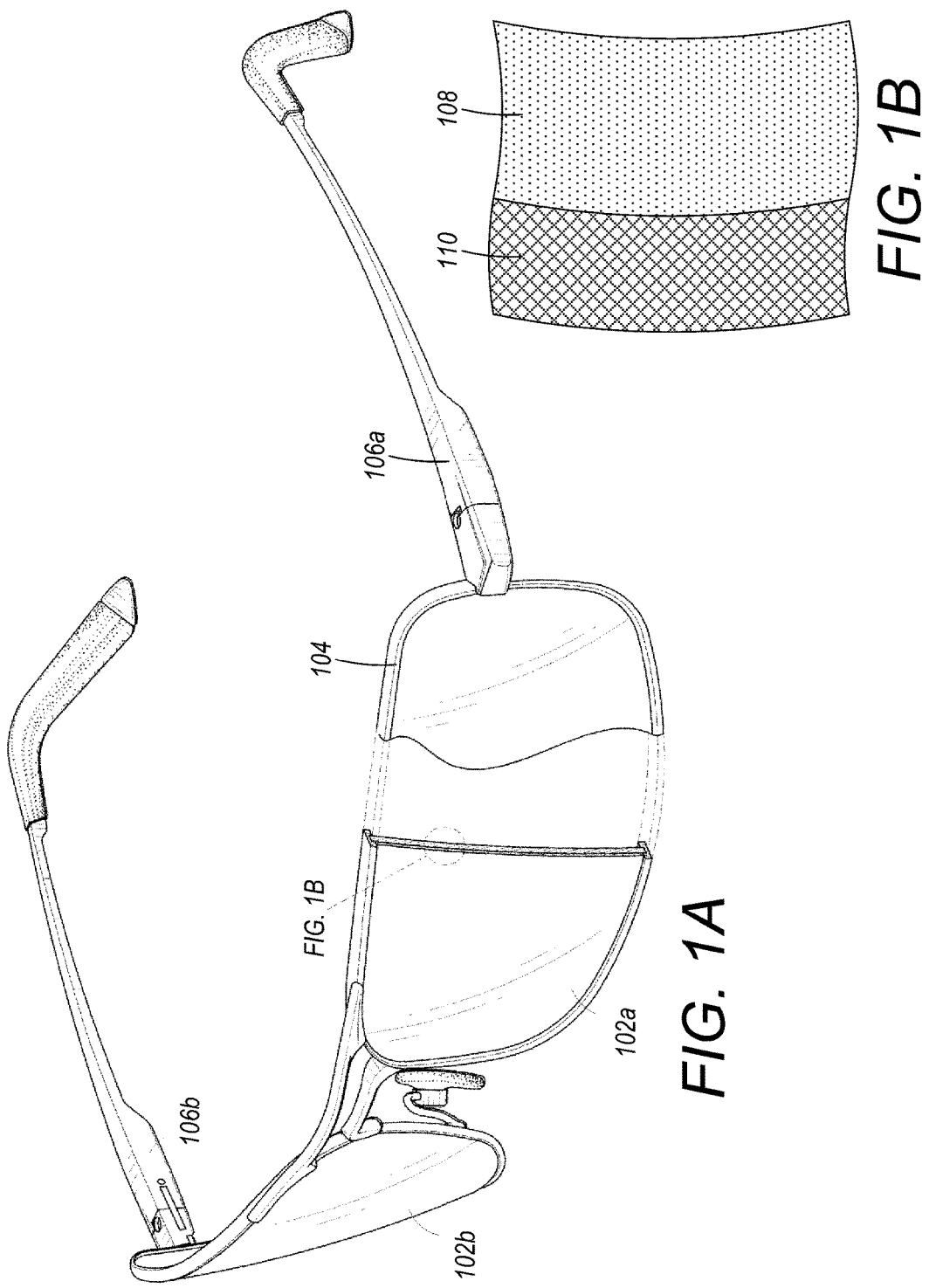

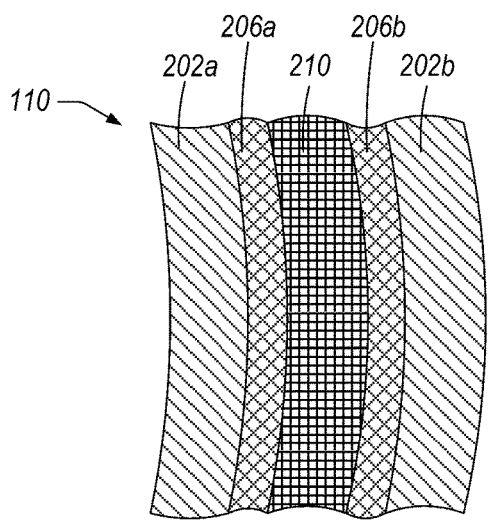
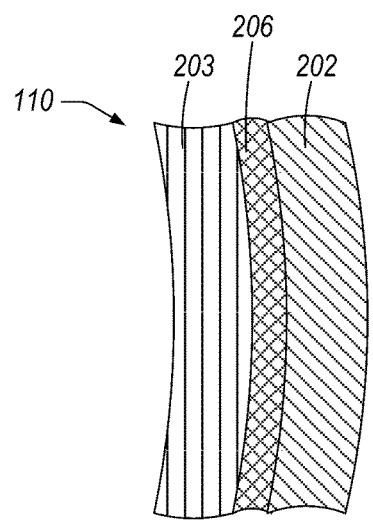
FIG. 8     FIG. 9
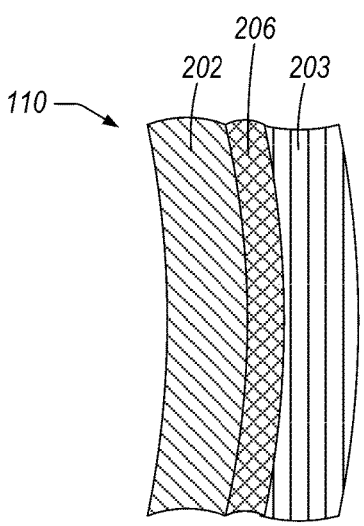
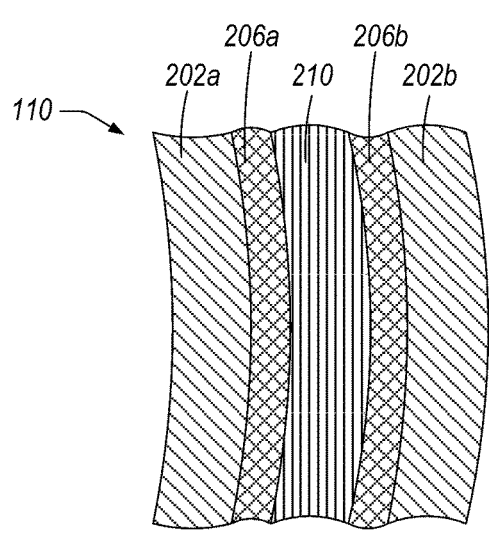
FIG. 10     FIG. 11

LAMINATED MIRROR LENS

CROSS-REFERENCE TO RELATED APPLICATIONS

This application claims the benefit of priority to U.S. Prov. Pat. App'n No. 62/059,763, filed Oct. 3, 2014, entitled "Laminated Mirror Lens," which is incorporated by reference herein in its entirety.

PARTIES TO A JOINT RESEARCH AGREEMENT

The subject matter disclosed in this application was developed and the claimed invention was made by, or on behalf of, Luxottica S.r.l. and Oakley, Inc., which are parties to a joint research agreement that was in effect on or before the effective filing date of the claimed invention. The claimed invention was made as a result of activities undertaken within the scope of the joint research agreement.

BACKGROUND

Field

This disclosure relates generally to eyewear and to lenses used in eyewear.

Description of Related Art

Eyeglasses include one or more lenses attached to a frame that positions the lenses on the wearer's head. Lenses typically include at least one lens body made from a substantially rigid material. In some cases, a hard coat is applied to the lens body to increase abrasion resistance and environmental durability of the lens. In some cases, a gradient and/or mirror stack is applied to the lens body with the hard coat to provide an aesthetically pleasing lens such that the gradient and/or mirror stack is external to the hard coat.

SUMMARY

Example embodiments described herein have innovative features, no single one of which is indispensable or solely responsible for their desirable attributes. Without limiting the scope of the claims, some of the advantageous features will now be summarized.

Embodiments disclosed herein include lenses for eyewear configured to reduce the appearance of scratches on the lens and/or increase the durability of the lens. The lens can include a functional stack applied to a lens body. A hard coat can be applied to the combined functional stack and lens body to increase abrasion resistance and environmental durability of the lens. The lens can be configured to include a gradient or mirror stack between the lens body and an optical substrate of the functional stack, for reducing the appearance of scratches on the lens. The combined lens body and functional stack can increase the durability of the lens relative to a lens with a thin film coating or other similar functional layer (e.g., a gradient or mirror stack) on an external surface of the lens.

Embodiments disclosed herein include methods for manufacturing lenses for eyewear, the methods configured to provide a number of processing and efficiency advantages relative to other manufacturing techniques. For example, the methods disclosed herein provide for greater manufacturing efficiencies due at least in part to less wasted material, continuous production, and/or lower costs. As another example, the methods provide for improvements in optical properties of lenses due at least in part to higher uniformity of dye and/or thin film deposition and/or higher quality thin film coatings. Using flat deposition techniques, thin film coatings can be produced that are more uniform and are of a higher quality compared to thin film coatings applied to curved surfaces. Applying a gradient to optical-grade transparent sheets can also result in improvements in the manufacturing process based at least in part to the ability of the manufacturer to position the gradient in a desired or targeted location and/or orientation. Furthermore, the gradient can be configured to be moved around or otherwise customized based on different lens designs, allowing a manufacturing process to produce sheets that can be used for a variety of lens designs and configurations. Some advantages of the disclosed methods include allowing for the alignment of the optical axis of the lens with the primary/straight-ahead line of sight of the wearer while still maintaining the optimal aesthetic positioning of the gradient line for a given design. This kind of alignment can result in lenses with superior optical properties (e.g. greatly reduced or eliminated prism power) and is difficult or not practically achievable when using conventional dip gradient tinting methods on lenses. Some examples of lenses that can benefit from the disclosed manufacturing methods and functional stacks are described in U.S. Pat. No. 6,168,271, entitled "Decentered Noncorrective Lens for Eyewear, issued Jan. 2, 2001, which is incorporated by reference herein in its entirety so as to form part of this specification. The manufacturing methods and functional stacks disclosed herein can provide advantageous features for these example lenses, and other similar lenses, as the procedure can improve and/or optimize the results of aligning the optical axis of the lens, the line of sight of the wearer, and the aesthetic positioning of the gradient line. Improving this alignment improves the optical performance of the lens for the wearer (e.g., by reducing or eliminating prism power).

Other advantages of the manufacturing methods disclosed herein include an increase in color consistency due at least in part to flat deposition techniques, short throw distances, and/or orthogonal angles of incidence when depositing or transferring dyes on a sheet. As disclosed herein, flat deposition techniques can produce thin film coatings and other functional layers that are of higher quality and greater uniformity relative to deposition techniques for curved surfaces, wafers, and the like.

Some of the manufacturing processes disclosed herein represent improvements over typical manufacturing techniques due at least in part to moving away from a batch vacuum deposition process and/or batch gradient process to a continuous roll-to-roll type of process. Some of the manufacturing processes disclosed herein represent improvements in the tinting process due at least in part to the ability to apply a tint to a sheet relatively quickly by avoiding the relatively long and highly variable dip tinting processes generally used to generate a gradient.

Some manufacturing methods disclosed herein include roll-to-roll processes that use relatively short throw distances at high deposition rates with relatively direct angles of incidence (e.g., close to 90 degrees) resulting in a more robust thin film structure on an extruded sheet and/or a more robust application of a dye through a sublimation process. In some embodiments, a roll-to-roll process may waste less material due at least in part to efficiencies of the transfer of dyes from the carrier film to the extruded sheet. In some embodiments, the methods disclosed herein are on-demand processes that can save time and material.

In some embodiments, roll-to-roll processes are used to manufacture functional stacks. The roll-to-roll process can provide a number of advantages in the manufacture of lenses. For example, it can increase uniformity of film or dye deposition in both directions on an optical grade transparent sheet that is part of the functional stack. Typically, the uniformity can such that variations in thickness across the deposition surface can be less than about 1%. As another example, the roll-to-roll process allows for continuous production, high reliability, and long uptimes. The roll-to-roll process can be used to incorporate gradients, solid colors, and/or thin film coatings (e.g., mirror stacks) onto optical grade transparent sheets to form a functional stack, as described in greater detail herein. Accordingly, the lenses described herein can be manufactured using processes that provide a number of advantages in addition to the advantageous features of the lens itself (e.g., increased durability).

In some embodiments, the lens body is constructed from a substantially rigid material having a curved or planar shape. The lens body can have any desired curvature, including, for example, cylindrical, spherical or toroidal. The functional stack can include one or more optical substrates with one or more functional layers. The optical substrates can be configured to include dyes or other materials configured to impart optical characteristics to the substrate. In certain embodiments, the functional stack can be applied to a convex and/or concave surface of the lens body. The functional stack can include one or more optical substrates and one or more functional layers to provide desired optical and/or mechanical characteristics with increased durability. Functional layers can include thin film coating(s). Functional layers can include, for example and without limitation, mirror stacks, gradients, polarizers, hard coatings, adhesives, index matching layers, anti-reflection coatings, interference stacks, anti-static coatings, infrared absorption layers, and/or anti-fog coatings or layers.

Some embodiments provide a lens that includes a lens body comprising a substantially rigid material, the lens body having a convex surface and a concave surface. The lens can include a functional stack bonded to the lens body. The functional stack can include a first flexible thin polymeric material having a first surface and a second surface opposite the first surface and a functional layer incorporated onto the first surface of the flexible thin polymeric material. The functional layer can be positioned between the lens body and the first flexible thin polymeric material. In this way, the functional layer can be protected from abrasion and environmental exposure to increase the durability of the lens and/or decrease the appearance of scratches on the lens.

In some implementations, the functional layer comprises a thin film coating. In certain implementations, the thin film coating comprises a mirror stack. The first flexible thin polymeric material can be polycarbonate or any other suitable optical-grade transparent film. The lens can further include an adhesive configured to bond the functional stack to the lens body. The lens can further include a hard coat layer disposed on an exterior surface of the lens body and an exterior surface of the functional stack, the hard coat layer comprising a substantially uniform layer of polymeric material configured to increase an abrasion resistance, a mechanical durability, and/or a chemical resistance of the lens. Other coatings can be applied to the lens, such as, for example and without limitation, an anti-fog coating, an anti-reflection coating, a hydrophobic coating, an anti-static coating, or any combination of these or other suitable coatings. In some implementations, a functional stack with a thin film coating (e.g., a mirror stack) can be coated with a gradient through a dipping process after lamination. For example, a gradient can be disposed on an exterior surface of the lens body and an exterior surface of the functional stack.

In some implementations, the functional stack can further include a second flexible thin polymeric material having a first surface and a second surface opposite the first surface, wherein the functional layer is positioned between the first and second flexible thin polymeric materials. The lens can further include an adhesive layer configured to bond the functional layer to the second flexible thin polymeric material. The first flexible thin polymeric material can include one or more dyes configured to impart a gradient or solid color to the first flexible thin polymeric material. The functional stack can include a polarizer layer positioned between the first and second flexible thin polymeric materials.

Eyewear can include a frame and a lens attached to the frame, the lens comprising a lens body and functional stack according to any of the embodiments disclosed herein.

Some embodiments provide for a method of manufacturing a lens that includes a functional stack incorporating a gradient. The method can include forming a lens body from a substantially rigid material, the lens body comprising a convex surface and a concave surface. The method can include forming a functional stack by incorporating a functional layer on a first flexible thin polymeric material. The method can include bonding the lens body to the functional stack such that the functional layer is disposed between the lens body and the first flexible thin polymeric material. The method can provide a lens where the functional layer can be protected from abrasion and environmental exposure to increase the durability of the lens and/or decrease the appearance of scratches on the lens.

In some implementations, the functional layer comprises a thin film coating. In certain implementations, incorporating the functional layer on the first flexible thin polymeric material comprises using a roll-to-roll process to transfer a dye from a carrier film to the first flexible thin polymeric material using a combination of heat and pressure. In certain implementations, incorporating the functional layer on the first flexible thin polymeric material comprises using a roll-to-roll process to deposit a thin film coating on the first flexible thin polymeric material. The method can further include forming a wafer from the first flexible thin polymeric material with the functional layer. Bonding the lens body to the functional stack can include positioning the functional stack in a mold and injection molding the lens body with the functional stack in the mold. In some implementations, forming the lens body can be simultaneous with bonding the lens body with the first flexible thin polymeric material. In a further implementation, the lens is formed simultaneously with bonding the lens body with the first flexible thin polymeric material by injection-molding the lens body onto the functional stack.

The method can further include adding a second flexible thin polymeric material to the functional stack such that the functional layer is disposed between the first and second flexible thin polymeric materials. The functional layer can include one of a mirror stack or a gradient.

In certain embodiments, the lens body is formed through injection molding. The lens body and optical substrate can be polycarbonate, polyamide, triacetate cellulose, polyethylene terephthalate, nylon, or other suitable optical material. Applying the gradient to the functional stack can include transferring the gradient to the optical substrate through roll-to-roll sublimation or ion-bonding sublimation. A dye can be incorporated on the flexible thin polymeric material through a sublimation process such that the dye is on a surface of the material, is infused within the material, or is both on the surface of the material and infused within the material. In certain implementations, the dye can decrease in concentration with an increase in depth from the surface in the material.

Eyewear can include a frame and a lens attached to the frame, the lens being manufactured according to any of the methods disclosed herein.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or structure can be removed or omitted. Throughout the drawings, reference numbers can be reused to indicate correspondence between reference elements.

FIG. 1A illustrates a perspective view of example eyewear incorporating lenses with one or more functional layers.

FIG. 1B illustrates a cross-section view of a lens of the eyewear of FIG. 1A.

FIGS. 6-16 illustrate various example functional stacks configured to be applied to a lens body.

DETAILED DESCRIPTION

Figure 1C:
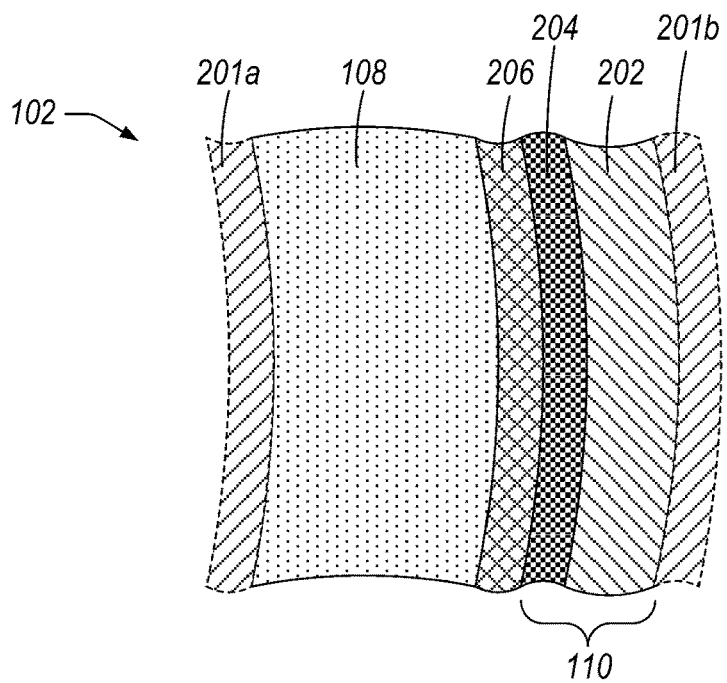
FIG. 1C illustrates an example embodiment of the lens illustrated in FIG. 1B.

Although certain embodiments and examples are disclosed herein, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process can be performed in any suitable sequence and are not necessarily limited to any particular disclosed sequence. Various operations can be described as multiple discrete operations in turn, in a manner that can be helpful in understanding certain embodiments; however, the order of description should not be construed to imply that these operations are order dependent. Additionally, the structures described herein can be embodied as integrated components or as separate components. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein.

A lens for eyewear can include a lens body that is coated with a hard coat to protect the lens body. To create a more aesthetically pleasing lens or infuse the lens with additional functionality, a mirror stack (e.g., a flash mirror) or other thin film coating can be applied to the lens with the hard coat. However, the thin film coating is vulnerable to abrasions and environmental damage that can degrade the lens. For example, when damage (e.g., a scratch) occurs in the mirror stack in such a lens, it is relatively noticeable and degrades the visual appearance of the lens. Lenses with thin film coatings as an outermost surface are vulnerable because these thin films may be the weakest and most easily damaged elements in the lens. It would be advantageous, then, to provide a lens with that incorporates thin film coatings or other similar functional layers wherein the thin film coatings are relatively resistant to abrasions and environmental damage.

Accordingly, lenses and methods for manufacturing lenses are provided herein that protect layers incorporating functional and/or aesthetic elements by positioning such layers within a functional stack such that the layers that are more vulnerable to abrasions and environmental damage are protected by the lens body and/or exterior laminates or sheets. For example, a lens can incorporate a lens body bonded to a functional stack comprising a mirror and/or gradient tint coating sandwiched between sheets of optical-grade transparent material. The mirror and/or gradient tint, then, are protected from abrasion and environmental damage by the lens body and/or sheets because surface damage does not affect these interior layers. In this way, the lens is more durable because it protects functional and aesthetic features within the functional stack. In addition, abrasions that may occur on the lens are less noticeable relative to a lens with a mirror stack or similar layer that is an outermost layer because the abrasions occur in a hard coat layer, lens body, or sheet rather than the mirror coating, for example. There are also manufacturing advantages for lenses constructed as described herein as the processes can increase manufacturing yields.

Some embodiments provide a lens that includes a lens body and a functional stack, wherein the lens is more durable than a lens having a thin film coating on an exterior surface. In some implementations, the lens is at least about 2 times more durable and/or less than or equal to about 30 times more durable, at least about 3 times more durable and/or less than or equal to about 20 times more durable, at least about 4 times more durable and/or less than or equal to about 15 times more durable, or at least about 5 times more durable and/or less than or equal to about 12 times more durable. The lens is configured to reduce the appearance of scratches by incorporating functional layers like thin film coatings (e.g., aesthetic layers such as a mirror stack) between the lens body and an exterior sheet in the functional stack. The lens can be configured to include functional and aesthetic features through layers in the functional stack. The functional stack can include layers that provide, for example and without limitation, flash mirrors, gradients, polarizers, index matching, anti-reflection, anti-static, photochromic properties, infrared absorption, low-efficiency polarization to reduce reflections, quarter wave plate retardants to reduce reflections, half wave plate retardants at targeted wavelengths to reduce reflections, and/or anti-fog coatings or layers.

In certain implementations, the functional stack comprises a single extruded polycarbonate sheet with a coating or layer on an interior surface of the sheet. The lens body can be an injection molded polycarbonate material. The lens can be formed by preparing an interior side of the functional stack with an adhesive and bonding the functional stack to the lens body such that the coating or layer is sandwiched between the lens body and the extruded polycarbonate sheet. The formed lens can also receive a hard coat. The thickness of the extruded polycarbonate sheet can be at least about 80 microns and/or less than or equal to about 500 microns.

In certain implementations, the functional stack comprises two extruded polycarbonate sheets with one or more layers between the sheets. The lens body can be an injection molded polycarbonate material. The lens can be formed by injection molding the lens body with the functional stack and applying a hard coat to the final product. The lens may also be formed by injection molding the lens body and then bonding the functional stack to the lens body using any suitable bonding technique. The thickness of each of the extruded polycarbonate sheets can be at least about 80 microns and/or less than or equal to about 200 microns. The total thickness of the functional stack can be at least about 80 microns and/or less than or equal to about 1 mm.

Methods for manufacturing lenses can include using a batch process to apply a hard coat to a batch of lenses. After application of the hard coat, a gradient tinting can be applied to the lens to provide an aesthetically pleasing lens. The lens can also receive a mirror coating by application of a thin film coating after the hard coat and/or gradient tint has been applied. A lens manufactured in this way can suffer from the disadvantages described herein, including vulnerability to abrasions and environmental damage that can degrade the lens. The manufacturing process itself may also prove relatively inefficient because it is difficult to uniformly deposit a thin film on a curved surface, such as a finished lens body. Furthermore, typical batch processes that apply thin film coatings utilize large throw distances and/or apply the coatings where the incidence angle is different from about 90 degrees, which can result in wasted material during the deposition process. Batch processes also can be time consuming and expensive to produce lenses with mirror coatings. It would be advantageous, then, to provide a manufacturing process that creates a lens that incorporates thin film coatings or other similar features wherein the thin film coatings are relatively resistant to abrasions and environmental damage. It would also be advantageous to provide such a manufacturing process wherein the process proves to be more efficient than typical manufacturing processes for providing lenses with similar features.

Some embodiments provide for a manufacturing process that includes incorporating a gradient or solid tint within a functional stack such that the tint is protected by the lens body and at least one extruded polycarbonate sheet. In certain implementations, an extruded polycarbonate sheet is processed using roll-to-roll sublimation to apply a gradient or solid color to a film and transfer the gradient or solid color to the sheet (e.g., using pressure and heat). The roll to roll sublimation process allows the dye to be deposited at relatively high deposition rates using relatively short throw distances and direct angles of incidence. This can result in less wasted material during the deposition stage. In certain implementations, a pre-formed wafer is treated such that its surface is electrically charged, sublimated molecules are treated to have an opposite charge (e.g., by running the molecules through a charged ion field), and the charged molecules are deposited on the sheet in a vacuum chamber through attraction of the opposite electric charges. This process can result in less wasted material because the material is attracted to the targeted surface. The lens with the lens body and functional stack can then be treated with a hard coat such that the gradient or solid tint is protected within the lens treated with the hard coat. In certain implementations, this process can advantageously be an on-demand process to produce lenses with a desired gradient or solid tint.

Some embodiments provide for a manufacturing process that includes incorporating a gradient tint and a mirror stack within a functional stack such that the gradient tint and the mirror stack are protected by the lens body and at least two extruded polycarbonate sheets. The functional stack can be manufactured by applying a mirror stack and a gradient or solid tint to an extruded polycarbonate sheet. The mirror stack and/or tint can be deposited using a roll to roll sublimation process, as described herein. A laminate can be formed using extruded polycarbonate sheets such that the mirror stack and gradient or solid tint are between the sheets. The resulting laminate can then be trimmed and formed to create a wafer suitable for application to a lens body.

In certain implementations, the lens manufacturing processes described herein can result in time savings, material savings, greater color consistency, greater material deposition consistency, and/or greater durability for the lenses. The lens manufacturing processes can result, in some embodiments, in yields that are greater than typical batch processes used to apply a gradient or solid tint and/or to apply a mirror stack to a lens. The lens manufacturing processes can provide, in some embodiments, a relatively low-cost lens that incorporates a mirror and/or gradient, wherein the mirror and/or gradient are more durable than a lens having a thin film coating or other similar functional layer on an exterior surface. In some implementations, the lens is at least about 2 times more durable and/or less than or equal to about 30 times more durable, at least about 3 times more durable and/or less than or equal to about 20 times more durable, at least about 4 times more durable and/or less than or equal to about 15 times more durable, or at least about 5 times more durable and/or less than or equal to about 12 times more durable.

Although some embodiments are discussed herein in terms of lenses having a lens body and/or optical-grade transparent sheets in the functional stack comprising polycarbonate, it will be understood by those having ordinary skill in the art that, in some embodiments, the lens body and/or optical-grade transparent sheets can comprise any suitable material or combination of materials such as, for example and without limitation, polycarbonate (or PC), allyl diglycol carbonate monomer (being sold under the brand name CR-39®), glass, nylon, polyurethane, polyethylene, polyamide, polyethylene terephthalate (or PET), biaxially-oriented polyethylene terephthalate polyester film (or BoPET, with one such polyester film sold under the brand name MYLAR®), acrylic (polymethyl methacrylate or PMMA), a polymeric material, a co-polymer, or a doped material. Furthermore, although some embodiments are discussed herein in terms of lenses having "cylindrical" or "spherical" front and rear surfaces (surfaces which conform substantially to a portion of the surface of a sphere or cylinder, respectively), it will be understood by those having ordinary skill in the art that, in some embodiments, lenses having different surface geometries can be used. Additionally, it will be understood that lenses of many front elevational shapes and orientations in the as-worn position can be used, beyond those illustrated herein.

Overview of Eyewear Having a Functional Stack Attached to a Lens Body

FIG. 1A illustrates a perspective view of example eyewear 100 incorporating lenses 102a, 102b comprising a lens body 108 with one or more functional layers in a functional stack 110. The eyewear 100 also includes frame 104 and earstems 106a, 106b. It should be noted that the thicknesses and relative thicknesses of the various lens elements are not drawn to scale but are drawn to more easily illustrate certain aspects of the eyewear 100. The eyewear 100 can be of any type, including general-purpose eyewear, special-purpose eyewear, sunglasses, driving glasses, sporting glasses, goggles, indoor eyewear, outdoor eyewear, vision-correcting eyewear, contrast-enhancing eyewear, chroma-enhancing eyewear, color-enhancing eyewear, color-altering eyewear, eyewear designed for another purpose, or eyewear designed for a combination of purposes. Lenses and frames of many other shapes and configurations may be used. For example, the eyewear 100 can have a single lens, such as in a goggle. The frame 104 can be made of a variety of suitable materials including, for example and without limitation, metal, acetate, nylon, etc. In an example embodiment, eyewear 100 can include a nylon substrate used as a frontside surface of a functional stack 110 with a polycarbonate lens body 108 and an acetate frame 104.

The lenses 102a and 102b can be corrective lenses or non-corrective lenses and can be made of any of a variety of optical materials including glasses or plastics such as acrylics or polycarbonates. The lenses can have various shapes. For example, the lenses 102a, 102b can be flat, have 1 axis of curvature, 2 axes of curvature, or more than 2 axes of curvature, the lenses 102a, 102b can be cylindrical, parabolic, spherical, flat, or elliptical, or any other shape such as a meniscus or catenoid. When worn, the lenses 102a, 102b can extend across the wearer's normal straight ahead line of sight, and can extend substantially across the wearer's peripheral zones of vision. As used herein, the wearer's normal line of sight shall refer to a line projecting straight ahead of the wearer's eye, with substantially no angular deviation in either the vertical or horizontal planes. In some embodiments, the lenses 102a, 102b extend across a portion of the wearer's normal straight ahead line of sight. Providing curvature in the lenses 102a, 102b can result in various advantageous optical qualities for the wearer, including reducing the prismatic shift of light rays passing through the lenses 102a, 102b, and providing an optical correction. Regardless of the particular vertical or horizontal curvature of one surface of the lens, however, the other surface of the lens may be chosen such as to minimize one or more of power, prism, and astigmatism of the lens in the mounted and as-worn orientation. In some embodiments, the eyewear 100 incorporates canted lenses 102a, 102b mounted in a position rotated laterally relative to conventional centrally oriented dual lens mountings.

The lenses 102a, 102b can be provided with anterior and posterior surfaces and a thickness therebetween, which can be variable along the horizontal direction, vertical direction, or combination of directions. In some embodiments, the lenses 102a, 102b can have a varying thickness along the horizontal or vertical axis, or along some other direction. The lenses 102a, 102b can have a tapering thickness along the horizontal axis and can be decentered for optical correction. In some embodiments, the lenses 102a, 102b can have a thickness configured to provide an optical correction. In some embodiments, the lenses 102a, 102b can be finished, as opposed to semi-finished, with the lenses 102a, 102b being contoured to modify the focal power. In some embodiments, the lenses 102a, 102b can be semi-finished so that the lenses 102a, 102b can be capable of being machined, at some time following manufacture, to modify their focal power. In some embodiments, the lenses 102a, 102b can have optical power and can be prescription lenses configured to correct for near-sighted or far-sighted vision. The lenses 102a, 102b can have cylindrical characteristics to correct for astigmatism.

The eyewear 100 can include a mounting frame 104 configured to support the lenses 102a, 102b. The mounting frame 104 can include orbitals that partially or completely surround the lenses 102a, 102b. It should be noted that the particular mounting frame 104 is not essential to the embodiments disclosed herein. The frame 104 can be of varying configurations and designs, and the illustrated embodiment shown in FIG. 1 is provided for exemplary purposes only. As illustrated, the frame 104 may include a top frame portion and a pair of ear stems 106a, 106b that are pivotably connected to opposing ends of the top frame portion. The earstems 106a, 106b can be configured to support the eyewear 100 when worn by a user. In some embodiments, the eyewear 100 includes a flexible band used to secure the eyewear 100 in front of the user's eyes in place of earstems 106a, 106b. Further, the lenses 102a, 102b may be mounted to the frame 104 with an upper edge of the lens 102a or 102b extending along or within a lens groove and being secured to the frame 104. For example, the upper edge of the lens 102a or 102b can be formed in a pattern, such as a jagged or non-linear edge, and apertures or other shapes around which the frame 104 can be injection molded or fastened in order to secure the lens 102a or 102b to the frame 104. Further, the lenses 102a, 102b can be removably attachable to the frame 104 by means of a slot with interfitting projections or other attachment structure formed in the lenses 102a, 102b and/or the frame 104. It is also contemplated that the lenses 102a, 102b can be secured along a lower edge of the frame 104. Various other configurations can also be utilized. Such configurations can include the direct attachment of the ear stems 106a, 106b to the lenses 102a, 102b without any frame, or other configurations that can reduce the overall weight, size, or profile of the eyeglasses. In some embodiments, the frame 104 is configured to retain a unitary lens that is placed in front of both eyes when the eyewear is worn.

The lenses 102a, 102b include a lens body 108 and a functional stack 110. The functional stack 110 can be substantially permanently affixed to the lens body 108. The laminate 110 and/or lens body 108 can include one or more layers that provide functional aspects to the lens. For example, the lens body 108 and/or laminate 110 can include a polarizing layer, one or more adhesive layers, a photochromic layer, electrochromic material, a hard coat, a flash mirror, a color tint, a liquid-containing layer, an antireflection coating, a mirror coating, an interference stack, chroma enhancing dyes, an index-matching layer, a scratch resistant coating, a hydrophobic coating, an anti-static coating, chroma enhancement dyes, color enhancement elements, trichoic filters, glass layers, hybrid glass-plastic layers, anti-reflective coatings, infrared absorption layers, low-efficiency polarizers, quarter wave plate retardants, half wave plate retardants, other lens elements, or a combination of lens components. If the lens 102 includes a photochromic layer, the photochromic material can include a neutral density photochromic or any other suitable photochromic. At least some of the lens components and/or materials can be selected such that they have a substantially neutral visible light spectral profile. In some embodiments, the visible light spectral profiles can cooperate to achieve any desired lens chromaticity, a chroma-enhancing effect, color enhancement, another goal, or any combination of goals. Examples of chroma-enhancing lenses are disclosed in U.S. Pat. Pub. No. 2013/0141693, entitled "Eyewear with Chroma Enhancement," filed Oct. 19, 2012, which is incorporated by reference herein in its entirety so as to form part of this specification. In some embodiments, the lenses 102a, 102b include one or more lens coatings on the lens body 108, the functional stack 110, or both. Examples of lenses having a lens body and a functional stack are disclosed in Int'l Pat. Pub. No. WO 2013/169987, entitled "Eyewear with Laminated Functional Layers," filed May 9, 2013, which is incorporated by reference herein in its entirety so as to form part of this specification.

In some embodiments, one or more advantages can be realized in at least some circumstances when a lens function, such as, for example, a mirror stack or color tinting, is added to a lens 102a, 102b using the functional stack 110 as described herein. For example, aesthetic or functional layers can be incorporated into the lens 102a or 102b such that the layers providing the aesthetic or functional properties are protected from abrasions and/or environmental damage. As described herein, aesthetic and/or functional layers can be sandwiched by the lens body and an extruded polycarbonate sheet or by two extruded polycarbonate sheets. In this way, these aesthetic and/or functional layers are not exposed to the same risks of damage that affect exterior surfaces.

In some embodiments, the lens body 108 can be an injection molded, polymeric lens body having a concave surface and a convex surface. The lens body 108 can be formed of polycarbonate (or PC), allyl diglycol carbonate monomer (being sold under the brand name CR-39®), glass, nylon, polyurethane, polyethylene, polyamide (or PA), polyethylene terephthalate (or PET), biaxially-oriented polyethylene terephthalate polyester film (or BoPET, with one such polyester film sold under the brand name MYLAR®), acrylic (polymethyl methacrylate or PMMA), triacetate cellulose (or TAC), a polymeric material, a co-polymer, a doped material, any other suitable material, or any combination of materials. The lens body 108 can be rigid and other layers of the lens can conform to the shape of the lens body 108 such that the lens body 108 dictates the shape of the lens 102a or 102b. In some embodiments, a thermoforming process can be used to conform the functional stack 110 to the lens body 108 having a shape described herein.

The lens body 108 can be injection molded, although other processes can be used to form the shape of the lens body blank, such as casting, thermoforming, or machining. In some embodiments, the lens body 108 is injection molded and includes a relatively rigid and optically acceptable material such as polycarbonate. The curvature of the lens body 108 would thus be incorporated into a molded lens blank. A lens blank can include the desired curvature and taper in its as-molded condition. One or two or more lens bodies of the desired shape may then be cut from the optically appropriate portion of the lens blank as is understood in the art. In some embodiments, the frame 104 is provided with a slot or other attachment structure that cooperates with the molded and cut shape of the lens body 108 and functional stack 110 to minimize deviation from, and even improve retention of, its as-molded shape. In some embodiments, the lens body 108 can be stamped or cut from flat sheet stock and then bent into the curved configuration using a process such as thermoforming. This curved configuration can then be maintained by the use of a relatively rigid, curved frame 104, or by heating the curved sheet to retain its curved configuration. In some embodiments, the functional stack 110 is a wafer and is bonded to the lens body 108 through an insert molding process. For example, the wafer can be placed in a mold and the lens body 108 can be formed through injection molding using the mold with the wafer. In this way, the steps of bonding the functional stack 110 to the lens body 108 and forming the lens body 108 can be performed at the same time.

The functional stack 110 can be attached to the lens body 108 during the injection molding process that forms the lens body 108. The functional stack 110 can be attached to the lens body 108, for example, through a thermally-cured adhesive layer, a UV-cured adhesive layer, electrostatic adhesion, pressure sensitive adhesives, or any combination of these. Examples of bonding technologies that may be suitable for attaching the functional stack 110 to the lens body 108 include thermal welding, fusing, pressure sensitive adhesives, polyurethane adhesives, electrostatic attraction, thermoforming, other types of adhesives, materials curable by ultraviolet light, thermally curable materials, radiation-curable materials, other bonding methods, other bonding materials, and combinations of methods and/or materials. In some embodiments, any technique suitable for affixing the functional stack 110 to the lens body 108 can be used. Some embodiments of a lens 102a or 102b includes a lens body 108 and a functional stack 110 that are bonded together. In some embodiments, the functional stack 110 and the lens body 108 can be integrally connected to each other and can be adhesively bonded together. In some embodiments, a colorant or dye can be included in an adhesive.

The functional stack 110 can include one or more optical-grade transparent sheets, such as extruded polycarbonate. The optical transparent sheets of the functional stack 110 can be PC, PA, TAC, PET, polyethylene, acrylic, nylon, polyurethane, BoPET, another sheet material, or a combination of materials. A sheet in the functional stack 110 can be modified to include dyes or other materials to infuse the sheet with aesthetic or functional qualities. For example, the sheet can be extruded PC with a gradient or solid color incorporated into the sheet. The functional stack 110 can include one more layers, such as thin film coatings, deposited onto an optical-grade transparent sheet. For example, the functional stack 110 can include a mirror stack applied on an interior surface of a sheet.

In certain implementations, the functional stack 110 can include one or more layers that serve various functions within the lenses 102a, 102b. For example, layers can be included in the functional stack 110 that provide optical properties such as optical filtering, polarization, photochromism, electrochromism, partial reflection of incoming visible light, chroma enhancement, partial or complete absorption of infrared light, color enhancement, color alteration, or any combination of these. The functional stack can include one or more low-efficiency polarizers on an inner or outer portion of the stack to reduce reflections. The functional stack can include a quarter wave plate retardant on either side of the stack to reduce reflections. The functional stack can include half wave plate retardants at targeted wavelengths coupled with dyes to reduce reflections. As another example, layers can be included in the functional stack 110 that provide mechanical protection to the lenses 102a, 102b, reduce stresses within the functional stack 110, or improve bonding or adhesion among the layers in the functional stack 110 and/or between the functional stack 110 and the lens body 108. As another example, the functional stack 110 includes layers that provide functionality to the lenses 102a, 102b such as anti-reflection functionality, anti-static functionality, anti-fog functionality (e.g., through an anti-fog coating or layer), scratch resistance, mechanical durability, hydrophobic functionality, reflective functionality, darkening functionality, aesthetic functionality including tinting, or any combination of these.

In some embodiments, the functional stack 110 can serve as a thermally-isolating element or vehicle that can incorporate elements (e.g., certain dyes) that may be degraded if subjected to high temperature manufacturing processes. As such, the functional stack 110 can be used to incorporate these types of functional elements into lenses that otherwise are formed and/or manufactured using high temperature processes. The functional stack 110 may be bonded to the lens body 108 using a UV-cured adhesive, thus further thermally isolating the functional stack 110 and the included functional layers from the high temperature processes associated with the manufacture of the lens body 108.

As an example of incorporating functionality into a lens 102, the functional stack 110 can include layers or elements that serve to tint the lens 102. Tinting can be added to a lens element in different ways. In some embodiments, color can be deposited on a sheet of the functional stack 110 using a vapor or liquid source. The color can coat the sheet or it can penetrate into the sheet. In some embodiments, color can be added to a material used to make the sheet, such as adding powdered color or plastic pellets to material that is extruded, injection molded, or otherwise molded into a sheet. In some embodiments where liquids are used, the color can be added by a dip process.

By applying a tint to the functional stack 110 or a sheet that becomes a part of the functional stack 110, a substantial increase in manufacturing capacity can be realized because of the nature of manufacturing the sheets. Another advantageous feature can be that undesired color transfer, e.g. to lens cloths of packaging, can be reduced or eliminated by not positioning the tinted layer on an exterior surface of the lens, e.g. putting the tinted layer between protective layers. Moreover, tinting can be applied to layers which do not experience high temperature processes during manufacture which can protect chromophores that may have poor heat stability. In some embodiments, tint is included in a layer, such as a functional layer or substrate layer. As an example, powdered dyes can be included with plastic pellets during the extrusion of the plastic sheets. The compatible dyes can form a substantially uniform mixture with the plastic to form a tinted plastic material. As another example, sublimation can be used to transfer dyes to an optical substrate. In some embodiments, a tinted layer can be constructed such that chromophores can be a principal component of the layer or a smaller fraction of the tinted layer, according to the desired chromatic properties of the layer. The thickness of the layer can be adjusted to achieve a desired color profile of the lens.

An advantage of incorporating functional elements into the functional stack 110 is that it provides a durable lens 102 that protects more vulnerable functional layers from abrasion and environmental damage. Furthermore, the ability to separately manufacture functional lens elements may also be an advantage. Thus, the functional stack 110 can be made in parallel with the lens body 108 and assembled to make a lens 102 having desired functional qualities, thereby increasing manufacturing capabilities and/or lowering costs.

FIG. 1B illustrates a cross-section view of a lens 102 of the eyewear 100 of FIG. 1A. The lens 102 includes the lens body 108 and the functional stack 110. The functional stack 110 is bonded to the lens body to impart a desired functionality to the lens 102. The functional stack 110 can be attached to either side of the lens body 108, and, in some embodiments, a functional stack 110 can be attached to both sides of the lens body.

FIG. 1C illustrates an example embodiment of the lens 102 illustrated in FIG. 1B. The functional stack 110 comprises a mirror or gradient 204 deposited on a back-side of a single sheet of extruded, optical-grade transparent film or sheet 202 (e.g., a polycarbonate sheet). The sheet 202 can have a thickness of at least about 80 microns and/or less than or equal to about 500 microns, at least about 100 microns and/or less than or equal to about 300 microns, or at least about 120 microns and/or less than or equal to about 200 microns. The functional stack 110 can be attached to the lens body 108 by treating the mirror or gradient 204 with an adhesive 206 and bonding the functional stack 110 to the injection-molded or cast lens body 108. The functional stack 110 can be attached to the lens body 108 at the time the lens body is formed. For example, an insert molding process can be used where the lens body 108 is injection molded onto the functional stack 110 (e.g., where the functional stack is a wafer). The functional stack 110 can be attached to the lens body 108 after the lens body 108 has been formed (e.g., through injection molding, thermoforming, casting, etc.), such as through the use of bonding or adhesives. In certain implementations, the lens body 108 can have an optical correction and/or decentration. In this way, the mirror or gradient 202 is sandwiched between the lens body 108 and the sheet 202, protecting the mirror or gradient 202 from abrasion and environmental damage. The combined functional stack 110 and lens body 108 can receive a hard coat 201a, 201b (e.g., through a dipping process) to add a further layer of protection for the lens 102. In some embodiments, no hard coat 201a, 201b is included on the lens 102 or only one hard coat 201a or 201b is included on the lens 102. In certain implementations, the functional stack 110 with the mirror or gradient 202 deposited on the back-side of the sheet or film 202 can be coated with a transition layer (e.g., the adhesive layer 206) configured to provide a suitable transition from the inorganic mirror coating to a partially- or fully-organic coating that could be suitable for directly bonding to the injection-molded lens body 108 via insert molding.

To illustrate the durability of a lens configured according to embodiments described herein, simulations can be run to compare a lens with a hard coat on an exterior surface and a lens having a mirror coating on an exterior surface of the lens. These simulations demonstrate advantages of some embodiments of the lenses described herein because mirror coatings included with such embodiments are protected by the lens body and/or polycarbonate sheets coated with a hard coat as contrasted with typical lenses having a mirror coating on an exterior surface. In these simulated tests, the test lenses with the hard coats act as a proxy for embodiments of lenses disclosed herein and the test lenses with external mirror coatings represent typical lenses with mirror coatings. The test lenses with the hard coat are suitable proxies for embodiments of lenses disclosed herein that include a functional stack attached to a lens body, where the lenses include a hard coat on an external surface. Two simulated tests were run on a number of samples. First, a simulated Bayer Abrasion test was run to determine the Bayer ratio of the lens samples. Second, a simulated test was run to determine the environmental durability of the lens samples. The second simulated test comprised simulating boiling the sample lenses in a defined salt water solution for some minutes.

TABLE 1 includes results of a simulated standard Bayer Abrasion test on 6 sample lenses, 3 sample lenses with a mirror coating on an exterior surface and 3 sample lenses with a hard coat on an exterior surface. Column 1 includes the sample number and column 2 includes whether the exterior surface is a mirror coating ("Mirror") or a hard coat ("HC"). For each sample, 3 measurements are displayed and column 3 indicates the measurement number for each sample. Columns 4-6 include measurements for the control lens (e.g., a lens with no exterior coating) and columns 7-9 include measurements for the sample lens (e.g., the lens with the mirror coating or hard coat). Column 10 includes the calculated Bayer ratio defined as Delta(std)/Delta(test).

TABLE 1

| Sample # | Description | Meas. | Control Lens | | | Test Lens | | | Bayer Ratio |
|---|---|---|---|---|---|---|---|---|---|
| | | | Initial Haze (std) | Final Haze (std) | Delta (std) | Initial Haze (test) | Final Haze (test) | Delta (test) | |
| 25 | Mirror | 1 | 0.21 | 14.20 | 14.02 | 0.36 | 3.06 | 2.71 | 5.18 |
| | | 2 | 0.22 | 14.20 | | 0.36 | 3.02 | | |
| | | 3 | 0.22 | 14.30 | | 0.35 | 3.11 | | |
| 26 | Mirror | 1 | 0.17 | 15.00 | 14.83 | 0.29 | 3.39 | 3.14 | 4.72 |
| | | 2 | 0.17 | 15.00 | | 0.28 | 3.46 | | |
| | | 3 | 0.17 | 15.00 | | 0.28 | 3.43 | | |
| 27 | Mirror | 1 | 0.20 | 13.00 | 12.73 | 0.24 | 3.11 | 2.78 | 4.57 |
| | | 2 | 0.21 | 12.90 | | 0.23 | 2.95 | | |
| | | 3 | 0.19 | 12.90 | | 0.23 | 2.99 | | |
| 28 | HC | 1 | 0.15 | 11.30 | 11.20 | 0.49 | 2.24 | 1.77 | 6.31 |
| | | 2 | 0.11 | 11.30 | | 0.44 | 2.24 | | |
| | | 3 | 0.15 | 11.40 | | 0.46 | 2.23 | | |
| 29 | HC | 1 | 0.14 | 10.70 | 10.63 | 0.29 | 2.07 | 1.78 | 5.97 |
| | | 2 | 0.14 | 10.70 | | 0.27 | 2.07 | | |
| | | 3 | 0.14 | 10.90 | | 0.32 | 2.08 | | |
| 30 | HC | 1 | 0.07 | 10.70 | 10.63 | 0.34 | 2.33 | 1.97 | 5.39 |
| | | 2 | 0.09 | 10.70 | | 0.32 | 2.27 | | |
| | | 3 | 0.06 | 10.70 | | 0.39 | 2.37 | | |

The results of the simulated test in TABLE 1 illustrate that the lenses with the hard coat consistently demonstrate a higher Bayer Ratio than the lenses with an external mirror coat. Accordingly, these simulations predict that the lenses with the external hard coat are more resistant to abrasions. Thus, these simulations also indicate that the lenses with mirror coatings incorporated into a functional stack with an external hard coat, such as some embodiments of lenses described herein, would be more resistant to abrasions.

Furthermore, a lens with an external hard coat rather than an external mirror coating or gradient can also reduce the appearance of abrasions that may occur. Scratches are more visible on a lens with a mirror coat on an exterior surface than on a lens with a hard coat on an exterior surface. Thus, lenses with mirror coatings incorporated into a functional stack, such as embodiments of lenses described herein, would be more resistant to the appearance of abrasions because abrasions are less noticeable and/or less visible than lenses with a mirror coating on an exterior surface.

TABLE 2 includes the results of a simulated boiling salt water test. Column 1 includes the sample number, column 2 includes the sample description (e.g., "mirror" or "HC," as in TABLE 1), and column 3 includes a test rating based on observations of the lenses after the simulated test. The test rating is defined in TABLE 3.

TABLE 2

| Sample # | Sample Description | Boiling Salt Water test rating |
|---|---|---|
| 1* | mirror | A3/C0 |
| 2* | mirror | A3/C1 |
| 3* | mirror | A2/C1 |
| 4* | mirror | A5/C0 |
| 5 | mirror | A5/B1/C2 |
| 6 | mirror | A5/B1/C2 |
| 7 | mirror | A4/B1/C2 |
| 8 | mirror | A4/B1/C2 |
| 9 | mirror | A4/B1/C2 |
| 10 | mirror | A4/B1/C2 |
| 11 | mirror | A4/B2/C2 |
| 12 | mirror | A4/B2/C2 |
| 13 | HC | A0/B3/C3 |
| 14 | HC | A0/B3/C3 |

TABLE 2-continued

| Sample # | Sample Description | Boiling Salt Water test rating |
|---|---|---|
| 15 | HC | A0/B3/C3 |
| 16 | HC | A0/B3/C3 |
| 17 | HC | A0/B3/C3 |
| 18 | HC | A0/B3/C3 |
| 19 | HC | A0/B3/C3 |
| 20 | HC | A0/B3/C3 |
| 21 | HC | A0/B3/C3 |
| 22 | HC | A0/B3/C3 |
| 23 | HC | A0/B3/C3 |
| 24 | HC | A0/B3/C3 |

TABLE 3

Test Rating

A5: No visible craze
A4: Hairline crazing, just visible point or cracks.
A3: Hairline crazing up to 25% of the lens surface.
A2: Hairline crazing up to 75% of the lens surface.

TABLE 3-continued

Test Rating

A1: Hairline crazing over entire lens surface.
A0: Severe fern-like or matte-like crazing over any region of lens
B3: No visible delamination of individual layers over entire lens.
B2: Partial delamination of individual layers up to 25% of the surface.
B1: Partial delamination of individual layers up to 75% of the surface.
B0: Total delamination of individual layers over entire lens surface.
C3: No visible delamination of all layers over entire lens.
C2: Partial delamination of all layers up to 25% of the surface.
C1: Partial delamination of all layers up to 75% of the surface.
C0: Total delamination of all layers over entire lens surface.

The results of the simulated test in TABLE 2 indicate that the lenses with the hard coat consistently demonstrate a better durability than the lenses with a mirror coat. It should be noted that for sample lenses 1-4, there is no "B" rating because the coating completely delaminated in the simulated test. Accordingly, the lenses with the hard coat would be more durable to environmental damage than lenses with mirror coatings on an exterior surface. Furthermore, scratches are more visible on a lens with a mirror coat on an exterior surface than on a lens with a hard coat on an exterior surface. Thus, lenses with mirror coatings incorporated into a functional stack, such as embodiments of lenses described herein, are predicted to be more resistant to damage and any damage to the lens surface that does occur would be less noticeable and/or less visible than for lenses with a mirror coating on an exterior surface.

Example Embodiments of a Lens with a Lens Body and Functional Stack

Figure 2:
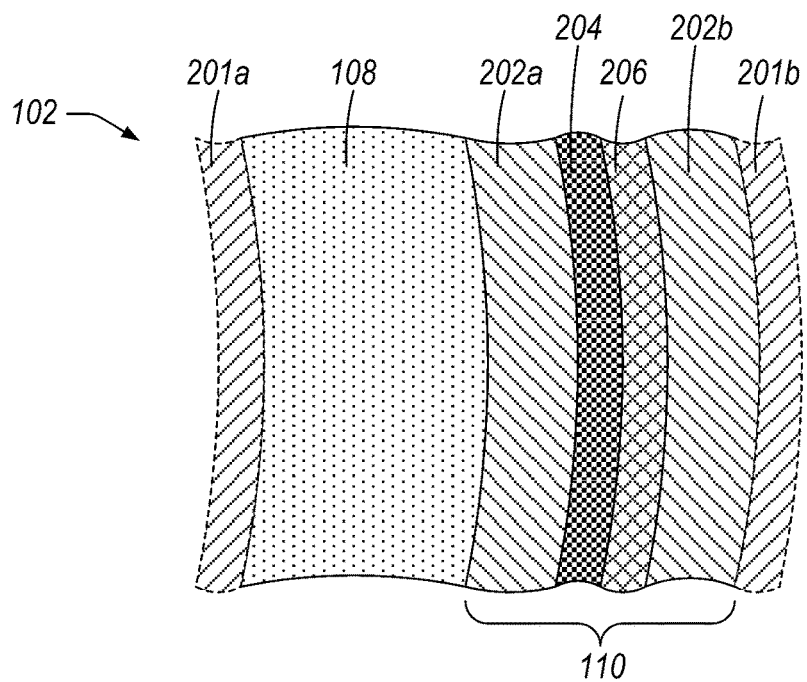
FIG. 2 illustrates a cross-section view of an example lens having a lens body and a mirror stack incorporated between two layers of extruded optical grade transparent film.

FIG. 2 illustrates a cross-section view of an example lens 102 having a lens body 108 and a functional stack 110 comprising a mirror stack or gradient 204 incorporated between two layers of extruded optical grade transparent film 202a, 202b. As described herein, the film layers or sheets 202a, 202b can comprise any suitable material including, for example, PC, PA, TAC, PET, or the like. The sheets 202a, 202b can be of the same material or different materials. In certain implementations, the functional stack 110 can include index matched materials to produce desired or targeted reflection characteristics. In some implementations, the functional stack 110 can include adhesives configured to bond injected material (e.g., an injection-molded lens body) and/or extruded layers to each other. The adhesives can be selected to provide index matching or mismatching to produce desired or targeted optical properties. For example, using like-index materials in boundary layers can give better index and AB numbers. As another example, mismatching indices in boundary layers can cut down on reflections. The combination of materials, considering their indices, can be configured to produce desired or targeted optical characteristics.

The lens 102 constructed with the functional stack 110 illustrated in FIG. 2 provides a number of advantages. For example, the lens 102 provides an abrasion-resistant mirror stack 204. The mirror stack 204 also exhibits environmental durability due at least in part to the mirror stack 204 not being directly exposed to the environment. As described herein, scratches or abrasions on the hard coat layers 201a, 201b are not as visible as scratches on a mirror stack. When producing the lens 102 using the functional stack 110 comprising the sheets 202a, 202b, flat deposition techniques can produce films of higher quality and greater uniformity. Furthermore, manufacturing processes can be improved by moving away from a batch vacuum deposition process and/or batch gradient process to a continuous roll-to-roll type of process.

Figure 3:
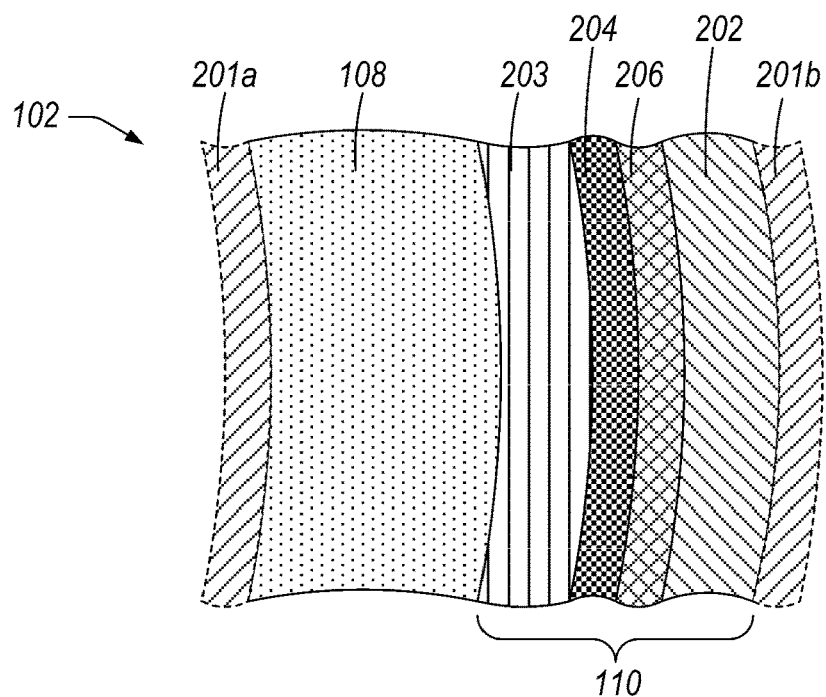
FIG. 3 illustrates a cross-section view of an example lens having a lens body and a mirror stack incorporated between a dye layer and a layer of extruded optical grade transparent film.

FIG. 3 illustrates a cross-section view of an example lens 102 having a lens body 108 and a functional stack 110 comprising a mirror stack 204 incorporated between a dye layer 203 and a layer of extruded optical grade transparent film or sheet 202. The dye layer 203 comprises a sheet of transparent film, similar to the sheet 202, but the extruded sheet of the dye layer 203 includes a dye that provides a gradient or solid color. The functional stack 110 includes a mirror stack 204 applied to the dye layer 203 and attached to the sheet 202 with adhesive layer 206. In some embodiments, the position of the dye layer 203 and the position of the sheet 202 can be swapped. In some embodiments, the mirror stack can be applied to the back-side of the sheet 202 and the adhesive layer 206 can be configured to attach the mirror stack 204 to the dye layer 203. The gradient or solid color can be achieved, for example, through inkjet or sublimation processes (e.g., roll-to-roll sublimation or ion bonding sublimation, as described herein) or added as a dye to the pellets used during extrusion of the sheet used to make the dye layer 203. The lens 102 can include a hard coat 201a, 201b to further protect the lens body 108 and functional stack 110.

The lens 102 constructed with the functional stack 110 illustrated in FIG. 3 provides a number of advantages. The lens 102 can comprise dyes that impart desirable or targeted optical characteristics to the lens 102, such as a gradient, a solid color tint, color transmission and/or reflection properties, light management properties, and the like. The lens 102 can include a gradient in the sheet 203 as well as a mirror stack 204. The general durability of the lens 102 improves due at least in part to the composition of the functional stack 110 and the hard coat 201a, 201b. Similar to the lens 102 described with reference to FIG. 2, the manufacturing process can include flat deposition techniques that result in higher quality control capabilities and lateral color uniformity. The functional stack 110 can also include heat-sensitive dyes (e.g., thermochroic dyes) that are protected from decomposition by being part of the extrusion process and not having to be compounded into injection moldable pellets. The functional stack 110 can also provide tinting benefits because a tint can be applied to the lens 102 relatively quickly by avoiding the relatively long and highly variable dip tinting processes used to generate a gradient.

In some embodiments, the functional stack 110 can be assembled by providing the extruded sheets (e.g., sheet 202 and dye layer 203) with the functional elements between them (e.g., the mirror stack 204) and cut wafers or chips from the resulting laminate. The resulting wafer or chip can be used inside an injection-molding chamber and the lens body can be injection-molded with the wafer or chip in the mold (e.g., on a back-side of the formed lens body). In some embodiments, the functional stack 110 can be bonded to the lens body 108 rather than injection molded. For example, an adhesive or other such bonding material can be put on the lens body 108 and/or functional stack 110 to attach them together.

Figure 4:
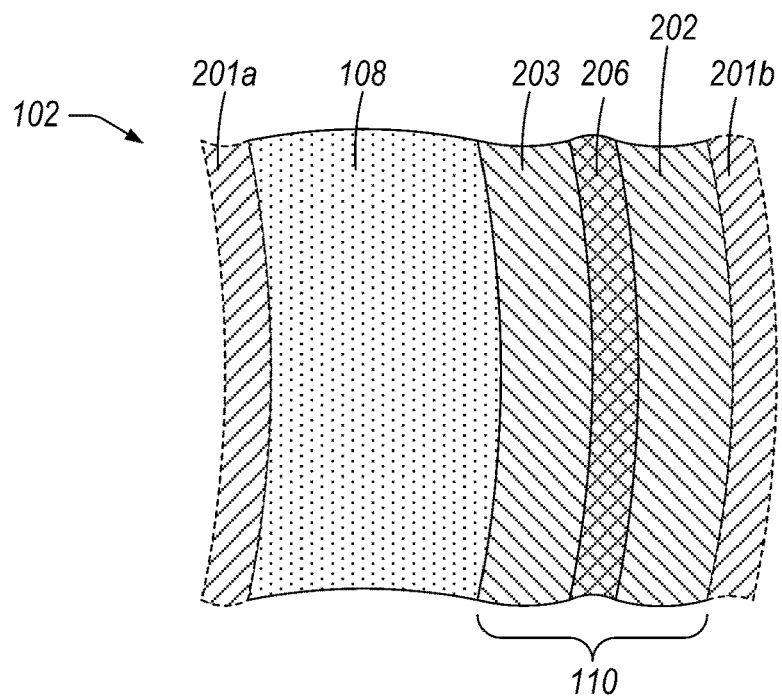
FIG. 4 illustrates a cross-section view of an example lens having a lens body, a dye layer, and a layer of extruded optical grade transparent film.

FIG. 4 illustrates a cross-section view of an example lens 102 having a lens body 108 and a functional stack 110 comprising a dye layer 203 and a layer of extruded optical grade transparent film or sheet 202. The lens 102 can thus be made to have a gradient, a solid color, or light management properties using appropriate or suitable dyes. The lens 102 thus can have an abrasion-resistant gradient, improving the general durability of the lens 102. Similar to the functional stacks 110 described herein, the manufacturing process to generate the functional stack 110 can result in greater color consistency and uniformity through flat film deposition. The dye layer insert 203 allows for control of reflections using light-management dyes. The dye layer insert 203 allows for the inclusion of dyes that are not compatible with the current PC or PA processes, thereby expanding the number and type of usable dyes in the lens 102. The lens 102 illustrated in FIG. 4 provides a number of advantages similar to the lens 102 illustrated in FIG. 3 without the mirror layer. As such, the benefits and advantages described with reference to FIG. 3 are applicable to the lens 102 illustrated in FIG. 4 as well.

Figure 5:
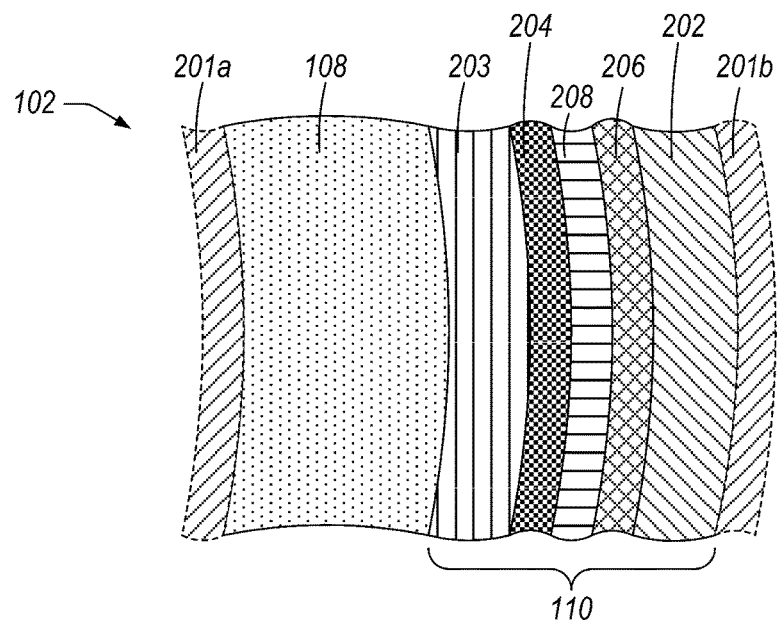
FIG. 5 illustrates a cross-section view of an example lens having a lens body bonded to a functional stack including a mirror stack, a polarizer layer, a dye layer, and a layer of extruded optical grade transparent film.

FIG. 5 illustrates a cross-section view of an example lens 102 having a lens body 108 bonded to a functional stack 110 that includes a mirror stack 204, a polarizer layer 208, a dye layer 203, and a layer of extruded optical grade transparent film or sheet 202. In this way, a polarized lens 102 can be provided that includes the advantages and functionality of the lenses described herein with reference to FIGS. 2-4. The functional stack 110 can position the dye layer 203 before or after the polarizer layer 208. The dye layer 203 can have the mirror stack 204 deposited thereon on a back-side and an adhesive layer 206 on a front-side, the adhesive layer 206 configured to bond the dye layer 203 to the sheet 202. The lens 102 can include a hard coat 201a, 201b on the lens body 108 and functional stack 110 to increase the durability of the lens 102.

The lens 102 provides a number of advantages similar to the lenses described with reference to FIGS. 2-4. In some embodiments, the polarizer layer 208 can provide glare-resistance to the lens 102 and can reduce stray reflections. In certain embodiments, index matching techniques can be used to provide desirable or targeted optical characteristics. For example, like or dissimilar index materials can be used in boundary layers to provide better index and AB numbers or to reduce reflections. For example, adhesives can be used to match the index of adjacent layers in the functional stack 110 or adhesives can be used that have an index that is dissimilar to adjacent layers in the functional stack 110. Using matching or similar index materials in adjacent layers can give better index and AB numbers. Using dissimilar or mismatched index materials in adjacent layers can reduce reflections. Any combination of materials can be used based at least in part on their indices to produce desired or targeted effects. In some embodiments, a dye or colorant can be used in the adhesive. This can be used to provide aesthetic and/or functional characteristics for the functional stack 110 and/or the lens 102.

Example Embodiments of Functional Stacks for a Lens

FIGS. 6-16 illustrate various example functional stacks 110 configured to be applied to a lens body 108. In the figures, only the functional stack 110 is illustrated, but it is to be understood that the functional stack 110 can be attached to a lens body 108 to form a lens 102. For example, the functional stack 110 can be added to an injection mold when a lens body is formed through an injection molding process. The functional stack 110 may also be attached or bonded to the lens body through a variety of bonding techniques described herein. The functional stacks 110 are configured to protect thin film coatings or other such layers in an interior of a formed lens to protect the coatings or layers from abrasion and environmental exposure.

Figure 6:
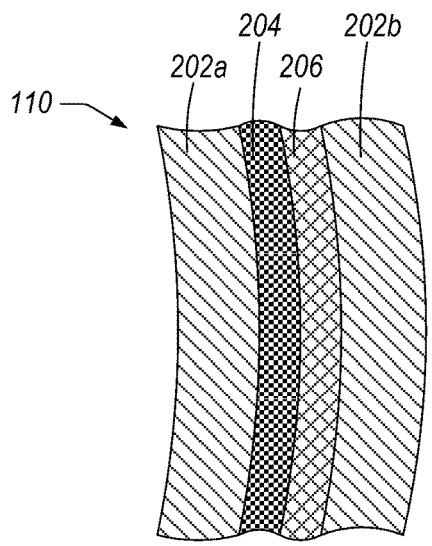

FIG. 6 illustrates a functional stack 110 comprising first extruded PC sheet 202a with a mirror stack 204 deposited on a front-side of the first sheet 202a and bonded to a second extruded PC sheet 202b with an adhesive layer 206.

Figure 7:
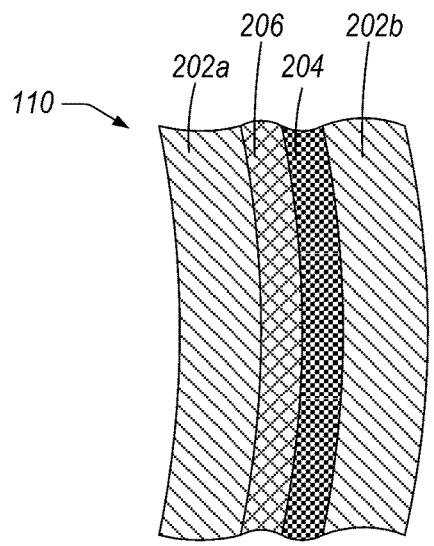

FIG. 7 illustrates a functional stack 110 comprising a first extruded PC sheet 202a bonded through an adhesive layer 206 to a mirror stack 204 deposited on a back-side of a second extruded PC sheet 202b.

FIG. 8 illustrates a functional stack 110 comprising a first extruded PC sheet 202a bonded through a first adhesive layer 206a to a plastic optical-grade transparent layer with a mirror 210 that is bonded through a second adhesive layer 206b to a second extruded PC sheet 202b.

FIG. 9 illustrates a functional stack 110 comprising first extruded PC sheet 203 having a gradient applied to a front-side of the first sheet 203 and bonded to a second extruded PC sheet 202 with an adhesive layer 206.

FIG. 10 illustrates a functional stack 110 comprising first extruded PC sheet 202 bonded to a second extruded PC sheet 203 with an adhesive layer 206, the second extruded PC sheet 203 having a gradient applied to a back-side.

FIG. 11 illustrates a functional stack 110 comprising a first extruded PC sheet 202a bonded through a first adhesive layer 206a to a plastic optical-grade transparent layer with a gradient 210 that is bonded through a second adhesive layer 206b to a second extruded PC sheet 202b.

Figure 12:
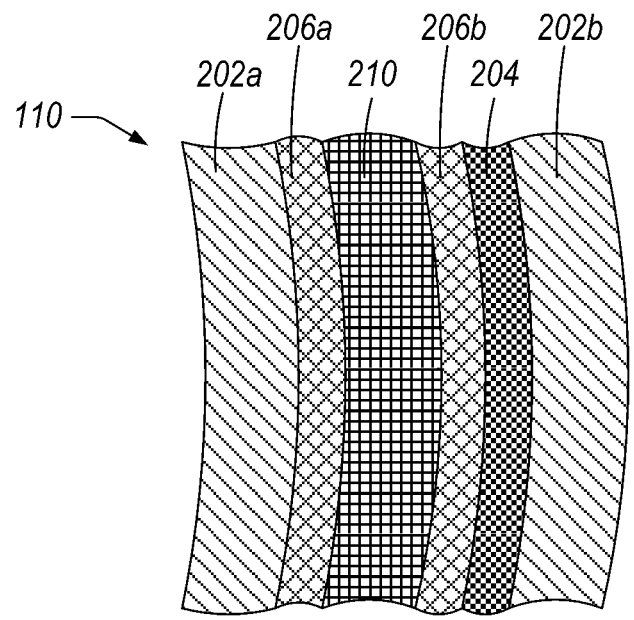

FIG. 12 illustrates a functional stack 110 comprising a first extruded PC sheet 202a bonded through a first adhesive layer 206a to a plastic optical-grade transparent layer with a gradient 210 that is bonded through a second adhesive layer 206b to a second extruded PC sheet 202b having a mirror stack 204 deposited on a back-side of the second sheet 202b.

Figure 13:
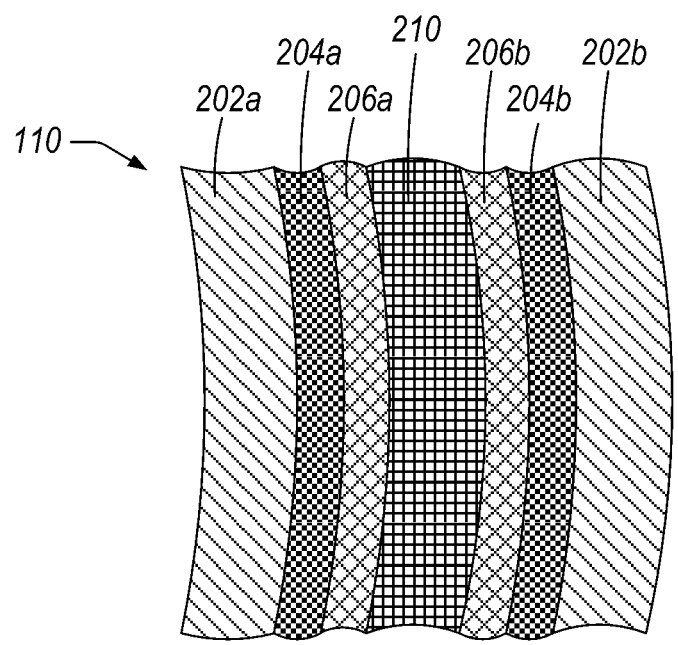

FIG. 13 illustrates a functional stack 110 comprising a first extruded PC sheet 202a having a first mirror stack 204a deposited on a front-side of the first PC sheet 202a, the first mirror stack 204a bonded through a first adhesive layer 206a to a plastic optical-grade transparent layer with a gradient 210 that is bonded through a second adhesive layer 206b to a second extruded PC sheet 202b having a second mirror stack 204b deposited on a back-side of the second sheet 202b.

Figure 14:
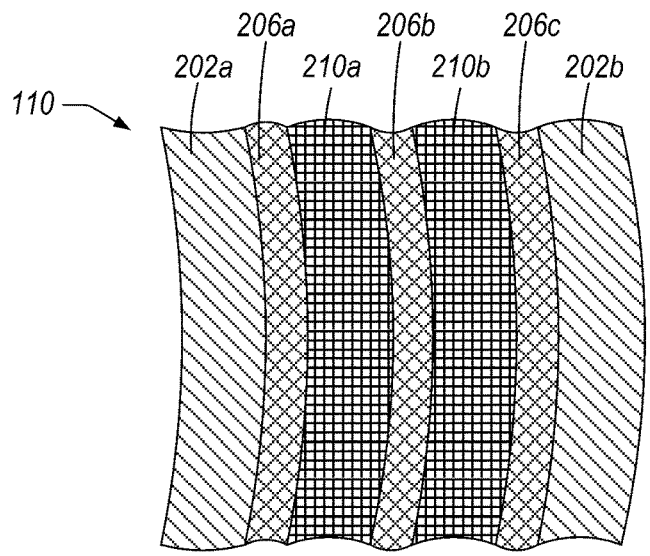

FIG. 14 illustrates a functional stack 110 comprising a first extruded PC sheet 202a bonded through a first adhesive layer 206a to a first plastic optical-grade transparent layer with a mirror 210a that is bonded through a second adhesive layer 206b to a second plastic optical-grade transparent layer with a gradient 210b that is bonded through a third adhesive layer 206c to a second extruded PC sheet 202b.

Figure 15:
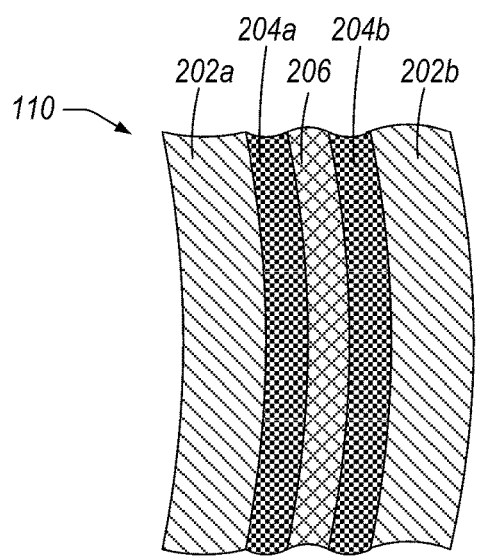

FIG. 15 illustrates a functional stack 110 comprising first extruded PC sheet 202a with a mirror stack 204a deposited on a front-side of the first sheet 202a and bonded, with an adhesive layer 206, to a gradient layer 204b deposited on a second extruded PC sheet 202b.

Figure 16:
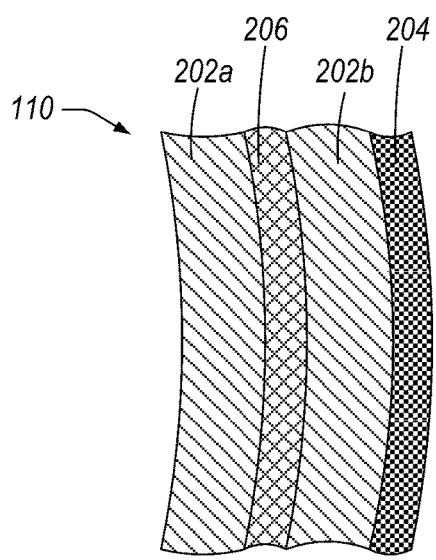

FIG. 16 illustrates a functional stack 110 comprising first extruded PC sheet 202a bonded with an adhesive layer 206 to a second extruded PC sheet 202b with a mirror stack 204 deposited on a front-side of the second sheet 202b. The functional stack 110 can be configured to be bonded to a lens body 108 such that the mirror stack 204 is positioned between the second PC sheet 202b and the lens body 108.

For the functional stacks 110 described with reference to FIGS. 6-16, the thickness of any individual sheet in the functional stack 110 can be at least about 80 microns and/or less than or equal to about 200 microns. The thickness of the sheets in the functional stack 110 can be configured to be appropriate or suitable for a roll-to-roll manufacturing process. The total thickness of the functional stack 110 can be at least about 80 microns and/or less than or equal to about 1 mm. The functional stacks 110 can include two extruded PC films or sheets as a result of roll-to-roll manufacturing techniques, wherein the two sheets include functional layers between them to protect and/or increase durability of the interior functional layers. The functional stacks 110 produced with such roll-to-roll techniques can provide the advantageous durability and functional qualities described herein with existing manufacturing machines, reducing the cost to implement such functional stacks 110 into the lens manufacturing process.

Methods of Manufacturing a Lens with a Functional Stack

Figure 17:
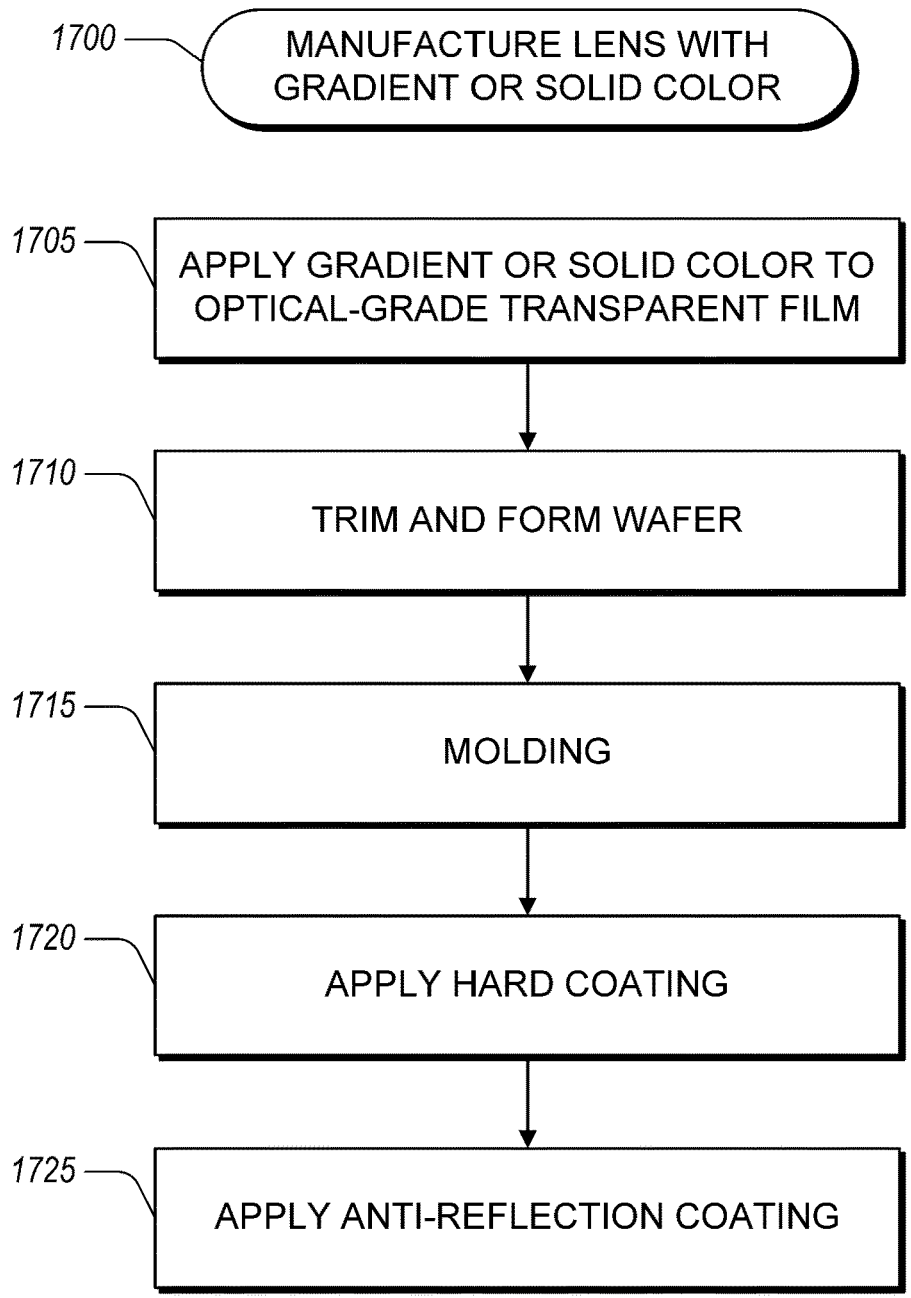
FIG. 17 illustrates a flow chart of an example method of manufacturing a lens with a functional stack comprising a gradient.

FIG. 17 illustrates a flow chart of an example method 1700 of manufacturing a lens with a functional stack comprising a gradient. The lens can be any of the lenses described herein with reference to FIGS. 1-16 and the functional stack can be any of the functional stacks that include a gradient or solid color applied to an optical-grade transparent film or sheet. The method 1700 can include forming a sheet with the gradient or solid color incorporated onto the transparent sheet using a roll-to-roll sublimation process, producing a wafer comprising the functional stack from the sheet, molding a lens body to the wafer to form a lens, applying a hard coat to the lens, and optionally applying an anti-reflection coating to the lens.

Figure 18:
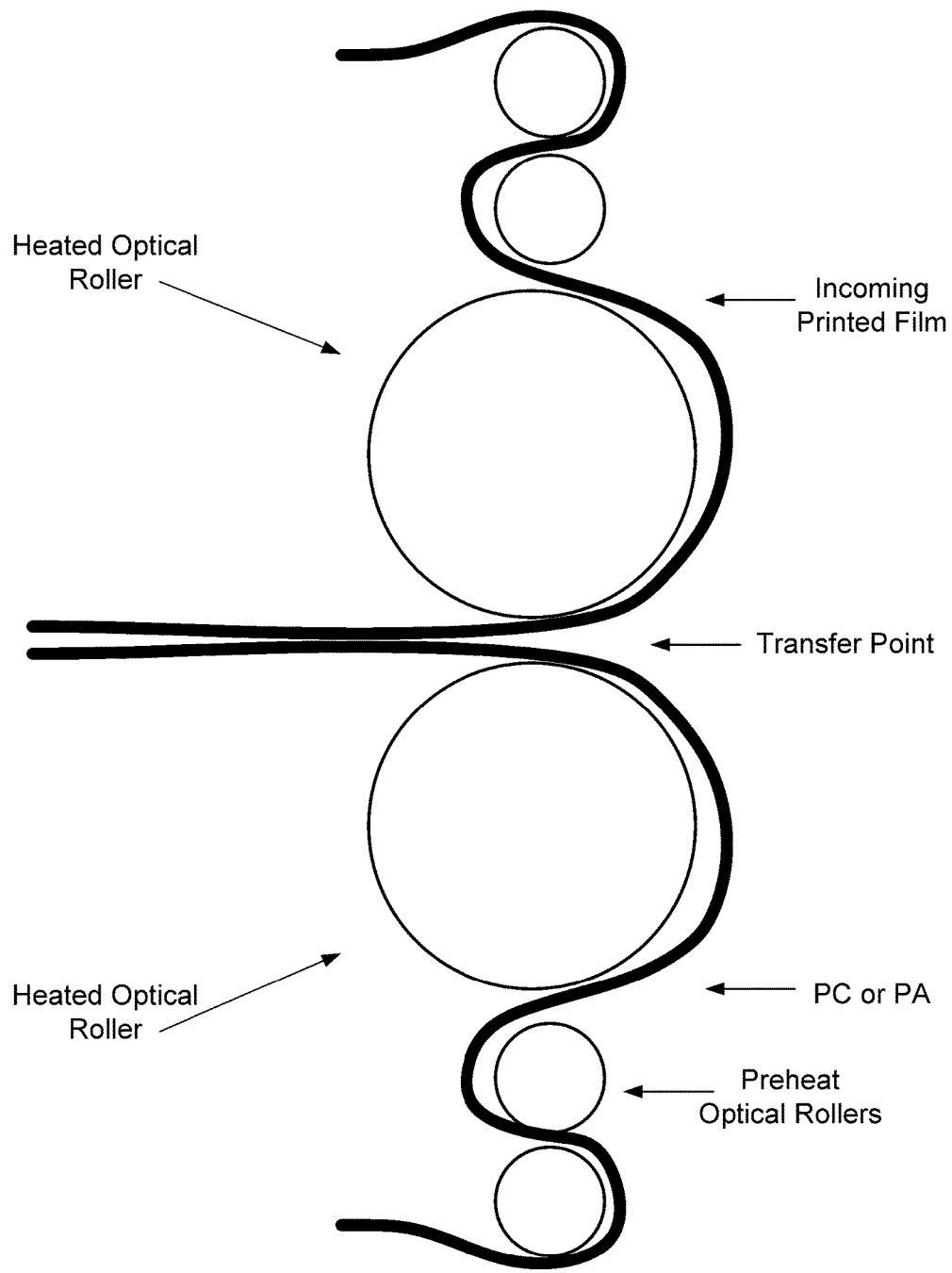
FIG. 18 illustrates an example process for roll to roll sublimation using a plurality of optical rollers.

In block 1705, a roll-to-roll sublimation process is used to transfer a gradient or solid color onto an extruded polycarbonate sheet (or other suitable optical-grade transparent material). FIG. 18 illustrates a schematic diagram to demonstrate an example roll-to-roll sublimation process. A carrier film that has a gradient or solid color printed on it can be run through heated optical rollers. Additionally, an extruded PC or PA film can be run through heated optical rollers. At a transfer or pinch point, the carrier film and extruded PC are pressed together and the gradient or solid color is transferred from the carrier film to the extruded PC through a combination of heat and pressure. In some embodiments, a film is inserted between the extruded PC and carrier film to absorb some of the energy to reduce or prevent damage to the gradient or solid color on the carrier film. In certain implementations, low energy dyes can be used such that the energy used in the sublimation process is less than the glass transition phase of the extruded PC. In some embodiments, the sublimated dyes can be deposited on a surface of the sheet, deposited within the sheet, or deposited both on the surface and within the sheet. In certain implementations, the concentration of dye can decrease with increasing distance from the surface of the sheet.

The roll-to-roll process can provide a number of advantages in some embodiments because it uses relatively short throw distances at high deposition rates with relatively direct angles of incidence (e.g., close to 90 degrees) resulting in a more robust thin film structure on the extruded PC and/or a more robust application of a dye through the sublimation process. The roll-to-roll process may also waste less material due to efficiencies of the transfer of dyes from the carrier film to the extruded PC. Other methods for depositing a similar thin film include dome coating systems and drum coating systems. The dome coating system can have a throw distance of between about 36 in. and 48 in., and can result in about a 40%-50% loss of material depending on lens geometry. The drum coating system can result in wasted material due at least in part to a relatively large throw distance coupled with a relatively short exposure time for the targeted lens element. For the roll-to-roll process, on the other hand, deposition rates are higher and more efficient due at least in part to relatively short throw distances, the angle of incidence is close to 90 degrees, and the thin films are being deposited on a flat sheet.

With reference to FIG. 17, in block 1710, a wafer is formed by cutting and forming a suitable portion of the extruded PC having a gradient or solid color applied thereto. The wafer can include additional layers as well as an additional extruded PC layer to sandwich the functional layers between extruded PC layers to protect the interior layers. In some embodiments, a hard coat can be applied on the wafer.

In block 1715, the wafer can be molded to a lens body. The lens body can be formed using an injection molding process where the wafer formed in block 1710 is placed in the injection mold and the material forming the lens body is injected into the mold. In this way, a lens can be formed that includes a lens body (e.g., injection molded PC) and a functional stack incorporating a gradient or solid color protected by the lens body and/or extruded PC films.

In block 1720, the lens can be coated with a hard coat. The hard coat can be applied, for example, using a dip coating process. The hard coat can provide further protection for the formed lens. In block 1725, an anti-reflection coating optionally can be applied to one or both surfaces of the formed lens with the hard coat. This can provide a lens with a hard coat and anti-reflection properties.

In some embodiments, a gradient can be formed on a lens through ion bonding sublimation. A wafer can be treated to make the surface of the wafer positively (or negatively) charged. Sublimated molecules can be run through an ion field to negatively (or positively) charge them. The treated wafer and sublimated molecules can be put in a vacuum chamber where the electric attraction of the molecules to the wafer can result in deposition of the molecules on the wafer. Either side of the wafer can be treated in this manner. The ion bonding sublimation process can be an exacting process as the sublimated molecules are attracted to the intended target. This can result in a savings of material and time.

In some embodiments, a lens can be formed wherein a roll-to-roll process is used to apply a thin film coating (e.g., a mirror coating) to an extruded PC film and an ion bonding sublimation process can be used to deposit dyes (e.g., a gradient or solid color) on a wafer (e.g., a lens body). The lens can include the functional stack comprising the extruded PC film with the thin film coating bonded to the lens body having the gradient or solid color deposited through ion bonding sublimation.

The method 1700 can provide a number of advantages, including that it is on-demand process that can save time and material. Based at least in part on the roll-to-roll process described herein, the consistency of color incorporated into a lens can be increased as color deposition occurs on a flat surface. Furthermore, the gradient or solid color film can be protected within the lens by the lens body and/or extruded PC films.

Figure 19:
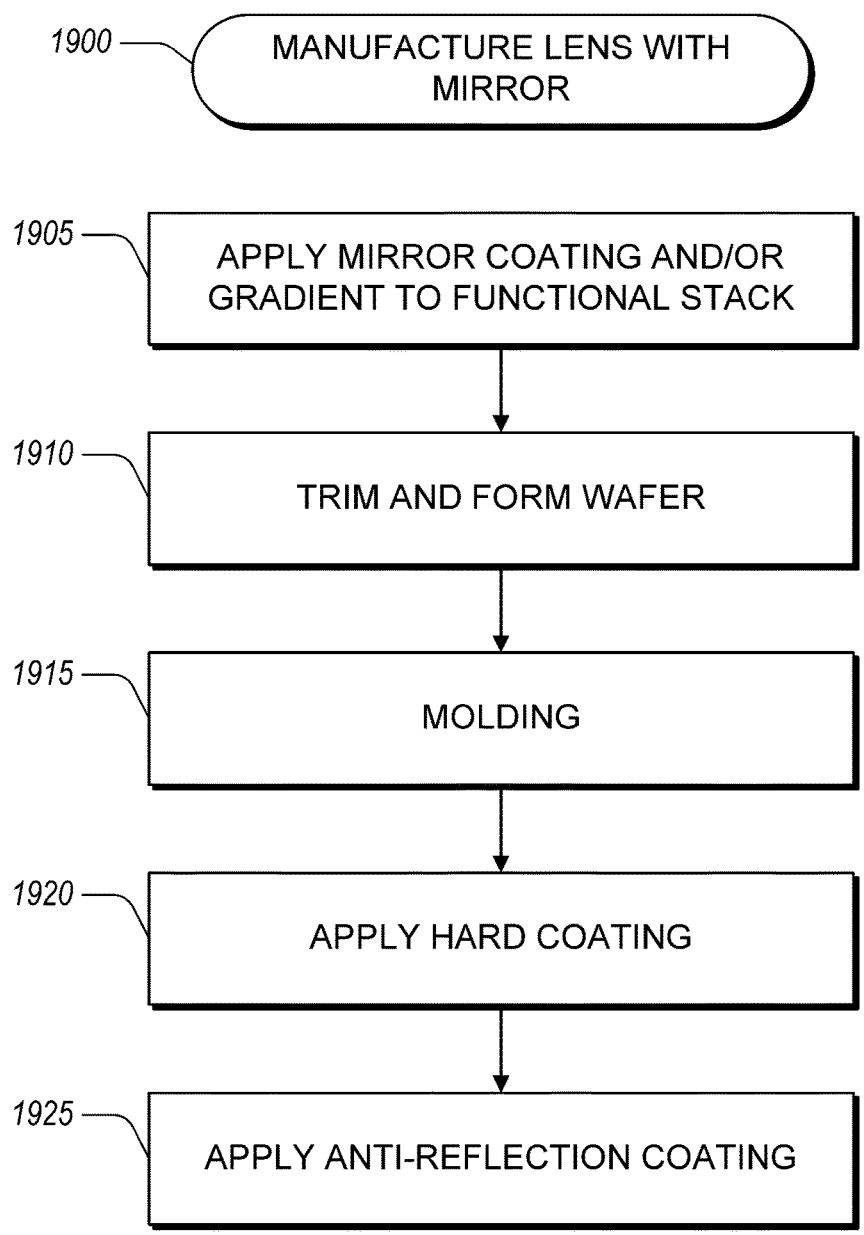
FIG. 19 illustrates a flow chart of an example method of manufacturing a lens with a functional stack comprising a gradient and/or a mirror stack.

FIG. 19 illustrates a flow chart of an example method 1900 of manufacturing a lens with a functional stack comprising a gradient and/or a mirror stack. The method 1900 is similar to the method 1700 with differences primarily in the initial preparation of the functional stack used with the lens body. The method 1900 illustrates a method of incorporating multiple functional layers in a functional stack, the functional stack being bonded to a lens body to form a lens that protects the functional layers in the functional stack.

In block 1905, a mirror coating and/or gradient film are deposited on one or more extruded PC films to form a functional stack. The mirror coating and/or gradient film can be deposited using a sheet processing technique. Extruded PC sheets can be rolled through a deposition chamber where one of the films (e.g., the mirror coating) is deposited on the sheet. The sheet can then be rolled through other deposition chambers or similar elements to deposit additional coatings on the extruded PC sheet. A functional stack can be formed from a roll-to-roll process that combines two or more extruded PC sheets to form a functional stack or laminate with a mirror coating, gradient, and/or other functional layer sandwiched between the extruded PC sheets. In this way, a mirror coating can be added during sheet processing such that the mirror coating is protected and shielded from abrasions and environmental exposure.

Blocks 1910, 1915, 1920, and 1925 are similar to corresponding blocks 1710, 1715, 1720, and 1725 described herein with reference to FIG. 17. In particular, in block 1910, the sheet formed in block 1905 is used to trim and form wafers to be used in a molding process in block 1915 to form a lens. The formed lens receives a hard coating in block 1920 and can optionally receive an anti-reflection coating in block 1925.

The method 1900 can provide a number of advantages, similar to the method 1700, including that the method 1900 can save time and material. Based at least in part on the deposition processes described herein during sheet processing, the consistency of color and mirror stack incorporated into a lens can be increased as thin film deposition occurs on a flat surface. Furthermore, the mirror, gradient and/or solid color film can be protected within the lens by the lens body and/or extruded PC films.

It is contemplated that the particular features, structures, or characteristics of any embodiments discussed herein can be combined in any suitable manner in one or more separate embodiments not expressly illustrated or described. In many cases, structures that are described or illustrated as unitary or contiguous can be separated while still performing the function(s) of the unitary structure. In many instances, structures that are described or illustrated as separate can be joined or combined while still performing the function(s) of the separated structures. It is further understood that the laminates disclosed herein can be used in at least some lens configurations and/or optical systems besides lenses.

It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Thus, it is intended that the scope of the inventions herein disclosed should not be limited by the particular embodiments described above, but should be determined by a fair reading of the claims.

What is claimed is:

1. A lens comprising:
   a lens body comprising a substantially rigid material, the lens body having a convex surface and a concave surface; and
   a functional stack bonded to the lens body, the functional stack comprising:
      a first flexible thin polymeric material having a deposition surface and a surface opposite the deposition surface; and
      a functional layer deposited onto the deposition surface of the first flexible thin polymeric material,
      wherein the functional layer is positioned between the lens body and the first flexible thin polymeric material.

2. The lens of claim 1, wherein the first flexible thin polymeric material has a thickness that is at least 80 microns and less than or equal to 500 microns.

3. The lens of claim 1, wherein the functional layer comprises a thin film coating.

4. The lens of claim 3, wherein the thin film coating comprises a mirror stack.

5. The lens of claim 1, wherein the first flexible thin polymeric material comprises polycarbonate.

6. The lens of claim 1, wherein the substantially rigid material is polycarbonate.

7. The lens of claim 1, further comprising an adhesive configured to bond the functional stack to the lens body.

8. The lens of claim 7, wherein the adhesive is configured to provide index matching between a thin film coating and the lens body.

9. The lens of claim 1, further comprising a hard coat layer disposed on an exterior surface of the lens body and an exterior surface of the functional stack, wherein the hard coat layer comprises a substantially uniform layer of polymeric material configured to increase an abrasion resistance, a mechanical durability, and/or a chemical resistance of the lens.

10. The lens of claim 1, wherein the functional stack further comprises a second flexible thin polymeric material having a first surface and a second surface opposite the first surface, and wherein the functional layer is positioned between the first and second flexible thin polymeric materials.

11. The lens of claim 10, wherein each of the first and second flexible thin polymeric materials has a thickness that is at least 80 microns and less than or equal to 200 microns.

12. The lens of claim 10, further comprising an adhesive layer configured to bond the functional layer to the second flexible thin polymeric material.

13. The lens of claim 12, wherein the first flexible thin polymeric material includes one or more dyes configured to impart a gradient or solid color to the first flexible thin polymeric material.

14. The lens of claim 13, further comprising a polarizer layer positioned between the first and second flexible thin polymeric materials.

15. Eyewear comprising a frame and the lens of claim 1 connected to the frame.

16. The lens of claim 1, wherein the functional stack is bonded to the convex surface of the lens body.

17. A lens comprising:
   a lens body comprising a substantially rigid material, the lens body having a convex surface and a concave surface; and
   a functional stack bonded to the lens body, the functional stack comprising a first flexible thin polymeric material having a first surface and a second surface opposite the first surface, the first flexible thin polymeric material having a dye applied to the first surface,
   wherein the first surface of the first flexible thin polymeric material is positioned between the lens body and the second surface of the first flexible thin polymeric material,
   wherein the functional stack further comprises a thin film coating positioned between the first flexible thin polymeric material and the lens body, and
   wherein the thin film coating comprises a mirror stack.

18. The lens of claim 17, wherein the dye is applied to the first surface of the first flexible thin polymeric material through a roll-to-roll sublimation process.

19. The lens of claim 18, wherein the functional stack further comprises a second flexible thin polymeric material having a first surface and a second surface opposite the first surface, and wherein the first surface of the first flexible thin polymeric material is positioned between the second surface of the first flexible thin polymeric material and the second flexible thin polymeric material.

20. The lens of claim 17, wherein the dye is applied so as to impart a gradient to the first flexible thin polymeric material.

21. The lens of claim 17, wherein the functional stack is bonded to the convex surface of the lens body.

* * * * *

UNITED STATES PATENT AND TRADEMARK OFFICE
CERTIFICATE OF CORRECTION

PATENT NO. : 10,520,756 B2
APPLICATION NO. : 15/515966
DATED : December 31, 2019
INVENTOR(S) : Gallina et al.

Page 1 of 1

It is certified that error appears in the above-identified patent and that said Letters Patent is hereby corrected as shown below:

On the Title Page

Item (73), (Assignees), Line 2, delete "Fotthill" and insert --Foothill--.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*